(12) United States Patent
Kuniyosi et al.

(10) Patent No.: US 9,088,182 B2
(45) Date of Patent: Jul. 21, 2015

(54) ELECTRIC POWER MANAGEMENT SYSTEM

(75) Inventors: Kenji Kuniyosi, Osaka (JP); Shinichi Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 557 days.

(21) Appl. No.: 13/498,755

(22) PCT Filed: Sep. 14, 2010

(86) PCT No.: PCT/IB2010/002285
§ 371 (c)(1),
(2), (4) Date: Mar. 28, 2012

(87) PCT Pub. No.: WO2011/039586
PCT Pub. Date: Apr. 7, 2011

(65) Prior Publication Data
US 2012/0181974 A1    Jul. 19, 2012

(30) Foreign Application Priority Data

Sep. 29, 2009 (JP) ................................. 2009-225067

(51) Int. Cl.
*H02J 7/00* (2006.01)
*H02J 3/38* (2006.01)
*H02J 13/00* (2006.01)
*H02J 3/24* (2006.01)
*H02J 7/35* (2006.01)

(52) U.S. Cl.
CPC ................. *H02J 3/383* (2013.01); *H02J 3/386* (2013.01); *H02J 13/0006* (2013.01); *H02J 3/24* (2013.01); *H02J 3/387* (2013.01); *H02J 7/35* (2013.01); *Y02E 10/563* (2013.01); *Y02E 10/566* (2013.01); *Y02E 10/763* (2013.01); *Y02E 40/72* (2013.01); *Y04S 10/12* (2013.01); *Y04S 10/123* (2013.01); *Y10T 307/675* (2015.04)

(58) Field of Classification Search
CPC ............ H02J 7/35; H02J 7/355; Y02E 60/12; H01M 10/465; H01M 16/006
USPC ........................................................ 320/101
See application file for complete search history.

(56) References Cited

U.S. PATENT DOCUMENTS

| | | | | |
|---|---|---|---|---|
| 6,100,643 | A * | 8/2000 | Nilssen ..................... 315/209 R |
| 2003/0023540 | A2* | 1/2003 | Johnson et al. ................. 705/37 |
| 2004/0070280 | A1 | 4/2004 | Nakata et al. |
| 2008/0167931 | A1* | 7/2008 | Gerstemeier et al. ............. 705/8 |
| 2010/0008119 | A1* | 1/2010 | O'Brien et al. ................ 363/132 |
| 2010/0023174 | A1* | 1/2010 | Nagata et al. ................. 700/287 |

FOREIGN PATENT DOCUMENTS

| | | |
|---|---|---|
| JP | 200078748 A | 3/2000 |
| JP | 2002152976 A | 5/2002 |
| JP | 2003324850 A | 11/2003 |
| JP | 2004135454 A | 4/2004 |
| JP | 2006033908 A | 2/2006 |
| JP | 2007-089317 A | 4/2007 |
| JP | 2007097310 | 4/2007 |
| JP | 2007185079 A | 7/2007 |

OTHER PUBLICATIONS

The International Search Report for PCT/IB2010/002285.
European Search Report dated May 9, 2014 issued in corresponding European application No. 10819967.1-1804.

* cited by examiner

*Primary Examiner* — Arun Williams
(74) *Attorney, Agent, or Firm* — Bacon & Thomas, PLLC

(57) ABSTRACT

An electric power management system includes a power generation apparatus for generating electric power, a power meter for receiving grid-connected information and a power conditioner for outputting the electric power generated by the power generation apparatus to the electric power system based on the grid-connected information. The grid-connected information is information related to stabilization of electric power of an electric power system from a management center for managing the electric power of the electric power system.

16 Claims, 12 Drawing Sheets

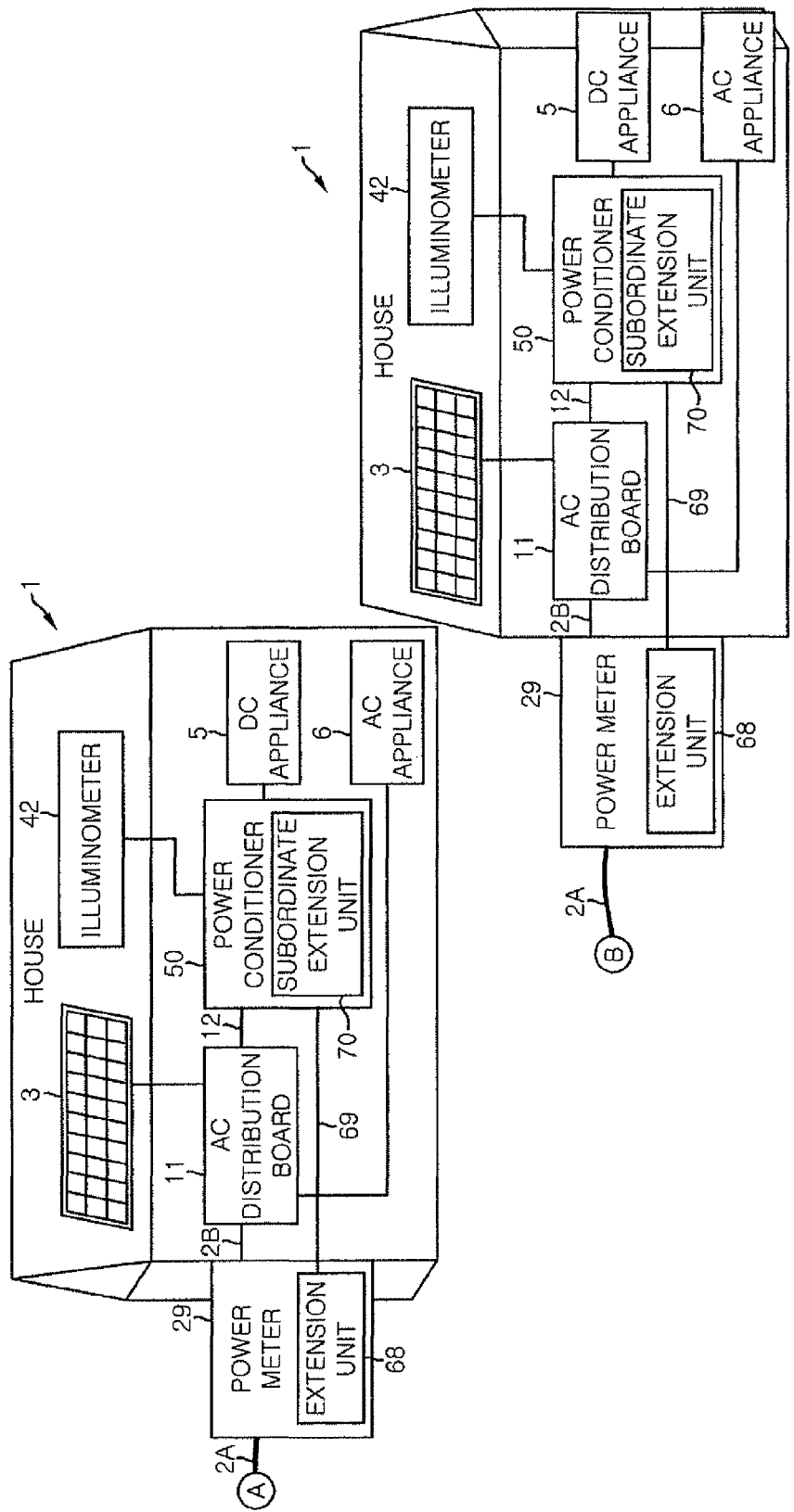

ELECTRIC POWER MANAGEMENT SYSTEM

FIELD OF THE INVENTION

The present invention relates to an electric power management system that performs an electric power management by associating an electric power generation apparatus, such as a photovoltaic power generation apparatus, with the electric power system of a commercial power source.

BACKGROUND OF THE INVENTION

Recently, the number of houses and offices equipped with a photovoltaic power generation apparatus (or solar cells) tends to increase. Power generation of the solar cell may be characterized that an increased amount of electric power is generated as the illuminance of sunlight grows higher, while a reduced amount of electric power is generated as the illuminance of sunlight becomes lower due to the rainy weather or other causes and no power is generated during the nighttime when there is no sunlight. For that reason, the power generation pattern thereof is not consistent with the power consumption pattern in houses or other places for many cases. Further, it is often the case that the generated power amount becomes excessively smaller than the consumed power amount. Accordingly, even if a house is equipped with a solar cell, the house is usually connected to an electric power system of a commercial power source so that, when the generated power amount is insufficient, the deficient electric power can be supplied (bought) from the commercial power source, and when surplus electric power is generated, the surplus electric power is reversely supplied (sold) to the commercial power source.

The electric power generated by the solar cell differs in nature from the electric power of the commercial power source. In light of this, the electric power generated by the solar cell is converted, by a power conditioner including an inverter and the like, to an electric power having the same nature as that of the alternating current power of the commercial power source and is used in association with the electric power system of the commercial power source. This makes it possible to use, in combination, the electric power generated by the solar cell in a house or other places and the electric power of the commercial power source. That is, the power conditioner is a device for converting the electric power generated by the solar cells so as to be made consistent with the electric power of the commercial power source in a voltage, a frequency and a phase, and an example thereof is described in Patent document 1.

The power conditioner described in Patent document 1 is configured to boost the voltage of a DC power generated by solar cells by using a step-up chopper, to convert the DC power into an AC power by using an inverter, and to output the AC power. An electric appliance and the electric power system of a commercial power source are connected to the output of the power conditioner. As described above, the power conditioner makes the power generated by the solar cells consistent to be associated with the electric power system of the commercial power source. The power conditioner converts the voltage of the power generated by the solar cells into a voltage higher than the voltage of the electric power system of the commercial power source and outputs the high voltage. Then, the power conditioner supplies the output power to the electric appliance, and reversely supplies (sells) surplus power, which is not consumed by the electric appliance, to the electric power system of the commercial power source.

Patent document 1: Japanese Patent Application Publication No. 2007-97310

When the surplus power is reversely supplied (output) to the commercial power source, the power conditioner increases the voltage of the output power to a voltage higher than the voltage of the electric power system of the commercial power source. However, if high-voltage powers are simultaneously outputted from multiple houses, the voltage of the electric power system of the commercial power source may be considerably increased. Furthermore, the increase in voltage may cause a variation, exceeding an allowable value, in the power of the electric power system of the commercial power source, and reduces the voltage difference between the voltage of the output power of the power conditioner and the voltage of the electric power system of the commercial power source, thereby reducing the amount of power outputted (sold) from the power conditioner to the electric power system of the commercial power source.

SUMMARY OF THE INVENTION

In view of the above, the present invention provides an electric power management system capable of stabilizing the quality of electric power to the electric power system of the commercial power source even when multiple power generation apparatuses, such as solar cells, are connected thereto.

In accordance with an embodiment of the present invention, there is provided an electric power management system for coordinating and managing an amount of electric power outputted from a power generation apparatus for generating the electric power to an electric power system of a commercial power source, the electric power management system including: a power meter for receiving grid-connected information, which is information related to stabilization of electric power of an electric power system from a management center for managing the electric power of the electric power system; and a power conditioner for outputting the electric power generated by the power generation apparatus to the electric power system based on the grid-connected information.

Further, the power meter is connected to the electric power system and configured to detect an amount of electric power inputted from the electric power system and an amount of electric power outputted to the electric power system. The power meter receives the grid-connected information from the management center through a first communications unit. The power conditioner is connected to the power generation apparatus and the electric appliance through respective power lines and acquires the grid-connected information from the power meter through a second communications unit. The power conditioner outputs the electric power generated by the power generation apparatus to the electric power system based on the grid-connected information.

The AC power quality (frequency, voltage, and the like) of the electric power system of the commercial power source is stabilized in a predetermined state, and the electric power from an power generation apparatus, such as an independent power generation apparatus (photovoltaic power generation apparatus), is outputted to the electric power system of the commercial power source to be connected to the power generation apparatus after grid-connection is achieved. In other words, the quality of the power from the power generation apparatus is adjusted to be consistent with that of the AC power of the electric power system of the commercial power source, and the adjusted power is outputted to the electric power system of the commercial power source after the voltage of the power is adjusted to a voltage that is higher than a voltage of the electric power system of the commercial power source.

In this case, when the supply of power to the electric power system of the commercial power source is performed by multiple power generation apparatuses, the voltage of the electric power system of the commercial power source may be increased. Furthermore, the increase in the voltage of the electric power system of the commercial power source may cause the problem of reducing the difference between the output voltage of each of the power generation apparatuses and the voltage of the electric power system of the commercial power source, which results in reduction of the amount of power to be outputted to the electric power system of the commercial power source.

However, with such configuration, the grid-connected information, which is information related to the electric power stabilization of the electric power system of the commercial power source that the power meter is received from a management center, is also shared to the power conditioner, and the electric power is outputted to the electric power system of the commercial power source from the power conditioner based on the grid-connected information. Since the grid-connected information is information related to the power stabilization of the electric power system of the commercial power source, the appropriate electric power based on the grid-connected information can be outputted to the electric power system of the commercial power source by the power conditioner. Further, the power conditioner can output the electric power to the electric power system of the commercial power source at an appropriate timing based on the grid-connected information. Accordingly, in accordance with the electric power management system, the quality of electric power can be stabilized by suppressing an increase in the voltage of the electric power system of the commercial power source and the like.

Further, grid-connected information is reliably and accurately transmitted to the power meter from the management center through the first communications unit managed same as the electric power system of the commercial power source. Accordingly, since such grid-connected information is used by the power conditioner, the grid connection of output power therefrom can be achieved more accurately, so that the stabilization of the power quality of the electric power system of the commercial power source can be maintained.

In the electric power management system, the power generation apparatus may be provided in plural numbers, and electric power generated by one of the power generation apparatuses may be stored in a battery device storing electric power, the battery device being another one of the power generation apparatuses.

With such configuration, since the electric power generated by the power generation apparatus can be stored in the battery device, the electric power generated by the power generation apparatus can be supplied to the electric power system of the commercial power source at an appropriate timing based on the grid-connected information. That is, the electric power to be consumed soon after generation is temporarily stored, and therefore the electric power can be efficiently outputted to the electric power system of the commercial power source based on the grid-connected information regardless of the timing of the generation, so that the electric power quality of the electric power system of the commercial power source is stabilized. Furthermore, the power generation apparatus can output a greater amount of electric power to the electric power system of the commercial power source.

Further, if it is determined based on the grid-connected information that the electric power generated by said one of the power generation apparatuses cannot be outputted to the electric power system of the commercial power source, the power conditioner may store the electric power, which is not consumed by the electric appliance, in the battery device.

With such configuration, in case where the electric power generated by the power generation apparatus cannot be outputted to the electric power system of the commercial power source in accordance with the determination based on the grid-connected information, the electric power, which is not consumed, is stored, thereby minimizing the waste of the generated electric power.

Further, if it is determined based on the grid-connected information that the electric power generated by said one of the power generation apparatuses can be outputted to the electric power system of the commercial power source, the power conditioner may output the electric power, which is generated by said one of the power generation apparatuses and stores in the battery device, from the corresponding battery device to the electric power system of the commercial power source.

With such configuration, in case where the electric power generated by the power generation apparatus can be outputted to the electric power system of the commercial power source in accordance with the determination based on the grid-connected information, the electric power generated by the power generation apparatus and temporarily stored in the battery device can be outputted to the electric power system of the commercial power source based on the preferred conditions, and therefore an increase in the amount of output power can be expected. Accordingly, when power is output to the electric power system of the commercial power source, the electric power can be efficiently outputted to the electric power system of the commercial power source and there is no concern about the output power making the power quality of the electric power system of the commercial power source unstable.

Further, the management center may acquire, as the grid-connected information, status information of the power generation apparatus from the power meter through the first communications unit, the status information being acquired by the power meter from the power conditioner corresponding to the power meter connected to the electric power system of the commercial power source through the second communications unit, and the management center may generate, based on the acquired information, grid-connected information including conditions for output power under which electric power is outputted to the electric power system of the commercial power source by the power conditioner.

With such configuration, the power conditioner is controlled by the management center such that the electric power is outputted to the electric power system of the commercial power source by the power conditioner based on the conditions for power output included in the grid-connected information, which is produced based on the contexts of the power generation apparatus, and therefore the power quality of the electric power system of the commercial power source is further improved.

Further, the power generation apparatus may further include a photovoltaic power generation apparatus. The status information of the power generation apparatus may include generation information indicative of an amount of electric power generated by the photovoltaic power generation apparatus, and illuminance information indicative of illuminance of light irradiating the photovoltaic power generation apparatus, which serves as environmental information indicative of surrounding environmental status of the photovoltaic power generation apparatus. Further, the management center may generate the conditions for output power included in the grid-connected information based on the amount of electric power generated by the photovoltaic power generation apparatus, the amount of the electric power being obtained based on the illuminance information and the generation information of the photovoltaic power generation apparatus.

With such configuration, since the conditions for power output included in the grid-connected information are generated based the amount of electric power generated by the photovoltaic power generation apparatus obtained based on generation information and illuminance information, which serves as environmental information, the electric power generated by the photovoltaic power generation apparatus can be efficiently outputted to the electric power system. Accordingly, more appropriate conditions for power output can be provided to the power generation apparatus, so that the stabilization of the electric power system of the commercial power source and the efficient use of the power generated by the power generation apparatus are further promoted.

Further, the power meter may be provided in plural numbers and the power meters may be connected to the electric power system of the commercial power source. The management center may estimate a change in illuminance of the photovoltaic power generation apparatus corresponding to each of the power meters, based on the illuminance information inputted through each of the power meters and location information indicative of a location of each of the power meters that outputs the illuminance information, and the management center may generate the grid-connected information based on the estimated change in illuminance.

With such configuration, the actually measured illuminance is collected through each power meter whose location is individually designated based on location information, and a change in the illuminance of the photovoltaic power generation apparatus corresponding to each power meter is estimated based on the distribution of the illuminance information. Accordingly, the accuracy of the estimation of the power generation amount of the photovoltaic power generation apparatus is improved, and the stabilization of the electric power system of the commercial power source can be improved using the grid-connected information generated based on the above estimation.

Further, the power conditioner may function as a estimation control unit for measuring and storing past power management data and producing estimated power consumption information indicative of an amount of electric power currently consumed, based on the stored power management data, and the management center may generate the grid-connected information by referring to the estimated power consumption information acquired from the power conditioner.

With such configuration, since the management center can perform the high-precision estimation of the power consumption amount of the power conditioner, the stabilization of the electric power system of the commercial power source can be performed in a planned manner.

Further, the management center and the power meter may perform relay communications through a base unit provided on a pole, and, among the communications between the management center and the base unit and the communications between the base unit and the power meter, the first communications unit may be configured such that the communications between the base unit and the power meter is wireless or wired communications.

With such configuration, the communications between the power meter and the base unit is performed in a wireless manner, the power meter does not require wiring installation for communications, and the time and space required for the wiring installation of a communications line to the power meter are eliminated. When the communications between the power meter and the base unit is performed in a wired manner, communications equipment is simplified and stable communications is ensured. For example, when power line communications is used as the wired communications, the wired communications between the power meter and the base unit can be performed without requiring new wiring installation for communications, thereby saving on wiring in the electric power management system.

BRIEF DESCRIPTION OF THE DRAWINGS

The objects and features of the present invention will be apparent from the following description of preferred embodiments which is given in conjunction with the accompanying drawings, in which:

FIGS. 2A and 2B show a specific configuration of the power management system of the first embodiment;

FIGS. 10A and 10B illustrate examples of the communications of each of the first to fourth embodiments, wherein FIG. 10A illustrates an example in which communications between a base unit and a power meter is wireless communications, and FIG. 10B illustrates an example in which communications between a power meter and a power conditioner is wireless communications;

DETAILED DESCRIPTION OF THE PREFERRED EMBODIMENTS

Figure 1:
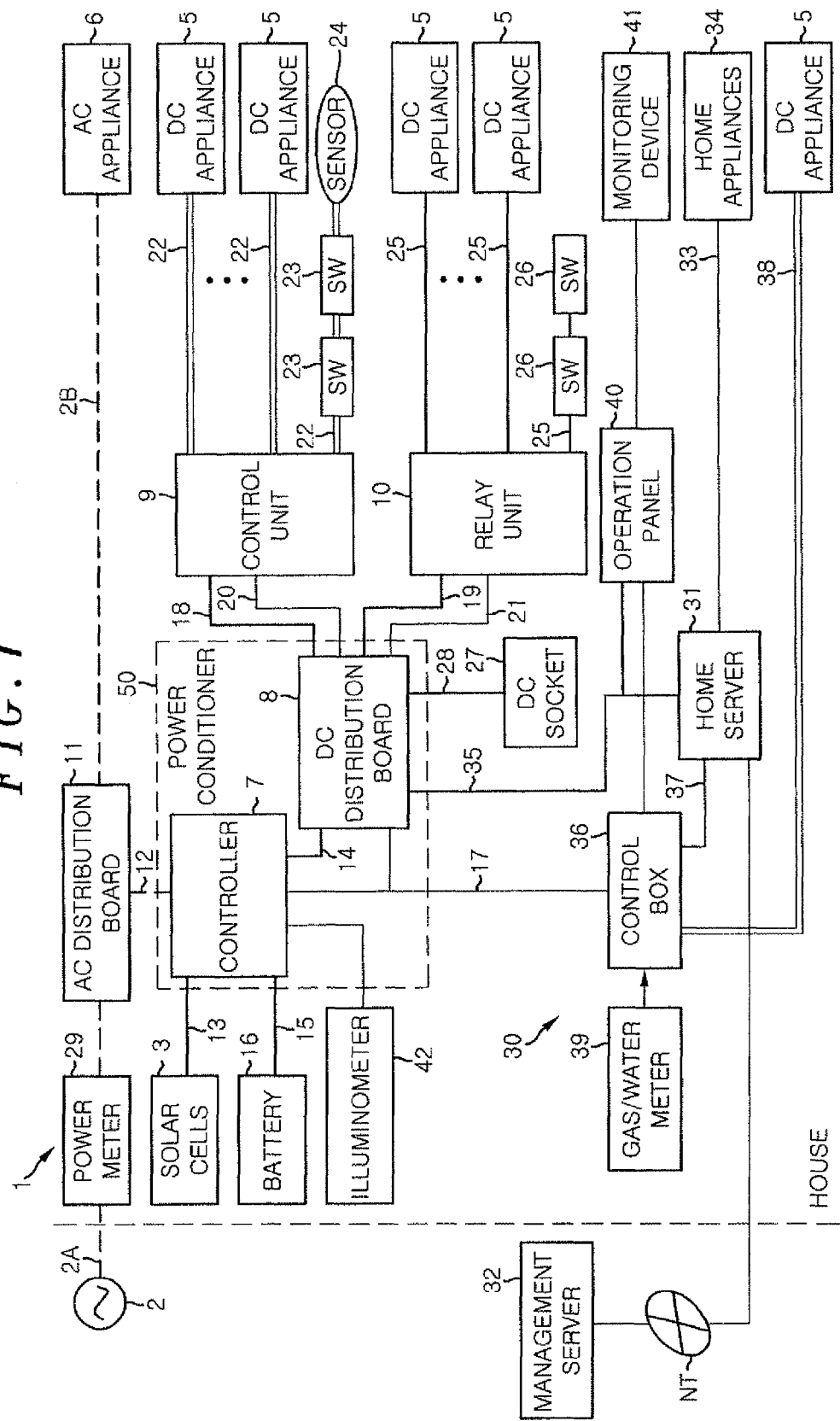
FIG. 1 is a functional block diagram illustrating a schematic configuration of a power supply system which forms a part of an electric power management system in accordance with a first embodiment of the present invention.

Hereinafter, embodiments of the present invention will be described with reference to the accompanying drawings which form a part hereof. Throughout the drawings, like reference numerals will be given to like parts, and redundant description thereof will be omitted.

First Embodiment

An electric power management system in accordance with a first embodiment of the present invention will be described in detail. FIG. 1 is a functional block diagram showing a schematic configuration of a power supply system 1 which forms a part of the electric power management system.

As shown in FIG. 1, a house is provided with the power supply system 1 for supplying an electric power to a variety of home appliances (such as an illuminating device, an air conditioner, an electrical device and an audiovisual device). In the following description, a single house will be taken as an example of the building to which the present invention is applied. However, it is not limited thereto. For example, the present invention may also be applied to building or collective housings such as an office, a shopping arcade and a factory. The power supply system 1 supplies the electric power of a home-use commercial AC source (or a commercial power source) 2 and further supplies the electric power from a solar cell 3 generating electric power with the sunlight to operate various kinds of appliances. The power supply system 1 supplies the electric power to not only DC appliances 5 operated with the DC power inputted from a DC power supply but also an AC appliance 6 operated with the AC power inputted from an AC power supply 2.

The power supply system 1 is provided with a power conditioner 50 including a controller 7 and a DC distribution board (in which a DC breaker is arranged) 8. The power supply system 1 is further provided with a control unit 9 and a relay unit 10 for controlling operations of the DC appliances 5 installed in the house.

An AC distribution board 11 for dividing the AC power is connected to the controller 7 through an AC power line 12. The controller 7 is connected to the commercial AC power source 2 via the AC distribution board 11 and is connected to the solar cell 3 via a DC power line 13. The controller 7 receives AC power from the AC distribution board 11 and receives DC power from the solar cell 3. The controller 7 converts the AC power and the DC power to a specified DC power to be used as the source power of the appliances. The controller 7 outputs the converted DC power to the DC distribution board 8 through a DC power line 14 or to a battery 16 through a DC power line 15 to thereby store the DC power in the battery 16. Not only does the controller 7 receive the AC power from the AC distribution board 11 but also the controller 7 can convert the electric power from the solar cell 3 or the battery 16 to an AC power and supply the AC power to the AC distribution board 11. The controller 7 exchanges data with the DC distribution board 8 through a signal line 17. An illuminometer 42 for measuring the illuminance of the light irradiated on the solar cell 3 is connected to the controller 7. Illuminance information as environmental information such as an illuminance value is transmitted from the illuminometer 42 to the controller 7.

The DC distribution board 8 is a kind of breaker for the DC power. The DC distribution board 8 divides the DC power inputted from the controller 7 and outputs the divided DC power to the control unit 9 through a DC power line 18 or to the relay unit 10 through a DC power line 19. The DC distribution board 8 exchanges data with the control unit 9 through a signal line 20 or with the relay unit 10 through a signal line 21.

In the power supply system 1, the power conditioner 50 for coordinating power management in the power supply system is configured in such a fashion as to include the controller 7 and the DC distribution board 8. In other words, the power conditioner 50 is connected to the AC distribution board 11, the solar cell 3, the battery 16 and the DC appliances 5 through individual power lines. Based on this, the power conditioner 50 is configured to measure the power information on the AC power supplied or reversely supplied (inputted or outputted) to or from the AC power source 2 and to measure the power information (power generation information) on the electric power generated by the solar cell 3 and the power information on the DC power consumed in the DC appliances 5.

Examples of the power information on the AC power include a voltage, a current, an electric power amount, a frequency and a phase. Examples of the power information on the DC power include a voltage, a current and an electric power amount. The power information selected from them is measured in the power conditioner 50. In the power conditioner 50, the power information on the AC power source 2 and the power information of the solar cell 3 and the DC appliances 5 thus measured are collected.

A plurality of DC appliances 5 is connected to the control unit 9. The DC appliances 5 are connected to the control unit 9 through respective DC supply lines 22 through which both DC power and data can be transmitted by using the same wiring. Communications signals for transmitting data with a high-frequency carrier wave are overlapped with the DC power to be supplied to the DC appliances 5 and are transmitted through the respective DC supply lines 22. For example, both the electric power and the data are transmitted to each of the DC appliances 5 by using a pair of lines. The control unit 9 receives the DC power for the DC appliances 5 through a DC power line 18 and determines how to control which of the DC appliances 5 based on an operation instruction obtained from the DC distribution board 8 through a signal line 20. Then, the control unit 9 outputs the DC power and the operation instruction to the designated DC appliances 5 through the corresponding DC supply lines 22, thereby controlling the operations of the DC appliances 5.

Switches 23 that are manipulated when the operations of the DC appliances 5 are switched over are connected to the control unit 9 through a DC supply line 22. In addition, a sensor 24 for detecting radio waves transmitted from, e.g., an infrared remote controller is connected to the control unit 9 through the DC supply line 22. Accordingly, the DC appliances 5 are controlled by transmitting communications signals through the DC supply lines 22 in response not only to the operation instruction from the DC distribution board 8 but also to the manipulation of the switches 23 and the detection in the sensor 24.

Further, the control unit 9 can transfer the power information on the electric power amounts consumed by the respective DC appliances 5 and the like to the power conditioner 50 (or the DC distribution board 8) through a signal line 20. As a result, the power information of the respective DC appliances 5 connected to the control unit 9 is collected in the power conditioner 50. Alternatively, the DC appliances 5 connected to the control unit 9 through the respective DC supply lines 22 can transfer the power information on the electric power amounts detected by themselves and the like to the power conditioner 50 through the control unit 9 so that the information can be collected in the power conditioner 50.

A plurality of DC appliances 5 is connected to the relay unit 10 through individual DC power lines 25. The relay unit 10 obtains the DC power for the DC appliances 5 through a DC power line 19, and determines which of the DC appliances 5 is to be operated based on an operation instruction obtained from the DC distribution board 8 through the signal line 21.

Further, the relay unit 10 controls the operations of the DC appliances 5 determined to be operated in such a way that relays built therein turn on and off the supply of powers through the DC power lines 25. A plurality of switches 26 for manually operating the DC appliances 5 is connected to the relay unit 10. The DC appliances 5 are controlled by manually manipulating the switches 26 to cause the relays to turn on and off the supply of powers to the DC power lines 25. The relay unit 10 can transfer the power information on the electric power amounts consumed by the respective DC appliances 5 and the like to the power conditioner 50 (or the DC distribution board 8) through the signal line 21. As a result, the power information of the respective DC appliances 5 connected to the relay unit 10 is collected in the power conditioner 50.

In other words, various kinds of power information of the power supply system 1 such as the power information measured by the power conditioner 50 itself and the power information detected by the control unit 9 and the relay unit 10 are collected in the power conditioner 50. These types of power information can be utilized as power management data in the power supply system 1. Furthermore, the power conditioner 50 can generate estimated consumption information indicating the current power consumption amount based on the power management data obtainable from the power information. That is, the power conditioner 50 also has a function of an estimation control unit for producing estimated power consumption information. Furthermore, the power conditioner 50 may generate grid-connected information based on power information measured by the power conditioner 50 itself, power information detected by the control unit 9 or relay unit 10, or power information received from the power conditioner of some other power supply system.

DC sockets 27 installed in the house in the form of, e.g., a wall socket or a floor socket, are connected to the DC distribution board 8 through a DC power line 28. If the plugs (not shown) of the DC appliances 5 are inserted into the DC sockets 27, it is possible to directly supply the DC power to the DC appliances 5.

A power meter 29 capable of remotely measuring the amount of the power used by the commercial AC power source 2 is connected between the commercial AC power source 2 and the AC distribution board 11. The power meter 29 is equipped with not only a function of remotely measuring an amount of power used by the commercial AC power source 2 but also, e.g., a power line communications (PLC) function and a wireless communications function. The power meter 29 transmits measurement results to an electric power company or the like through power line communications or wireless communications.

In the present embodiment, the communications between the power meter 29 which transfers the measurement results to the electric power company and the power company is performed as follows. Communications is performed between the power company and an electric pole through a well-known communications line. Moreover, communications is performed between the communications line and the power meter 29 by virtue of power line communications in which a lead-in power line 2A connected to a step-down transformer TR (see FIGS. 2A and 2B) is used as a communications medium.

The power supply system 1 is provided with a network system 30 that makes it possible to control various kinds of home appliances through network communications. The network system 30 includes a home server 31 that functions as a control unit thereof. The home server 31 is connected to an outdoor management server 32 through an external communications network N such as the Internet and is also connected to home appliances 34 through a signal line 33. The home server 31 is operated by the DC power supplied from the DC distribution board 8 through a DC power line 35.

A control box 36 for managing the operations of various kinds of home appliances controlled through network communications is connected to the home server 31 through a signal line 37. The control box 36 is connected to the controller 7 and the DC distribution board 8 through a signal line 17. The control box 36 is capable of directly controlling the DC appliances 5 through a DC supply line 38. A gas/tap water meter 39 capable of remotely measuring, e.g., the amounts of gas and tap water used, is connected to the control box 36. The control box 36 is connected to an operation panel 40 of the network system 30. A monitoring device 41 formed of, e.g., a door phone extension unit, a sensor or a camera, is connected to the operation panel 40.

If an operation instruction to operate the various kinds of home appliances is inputted through the external communications network NT, the home server 31 notifies the control box 36 of the operation instruction and operates the control box 36 so that the home appliances can be operated based on the operation instruction. Moreover, the home server 31 can provide various kinds of information obtained from the gas/tap water meter 39 to the management server 32 through the external communications network N. If an abnormality detected by the monitoring device 41 is notified to the home server 31 through the operation panel 40, the home server 31 provides the information on the detected abnormality to the management server 32 through the external communications network N.

Figure 2A:
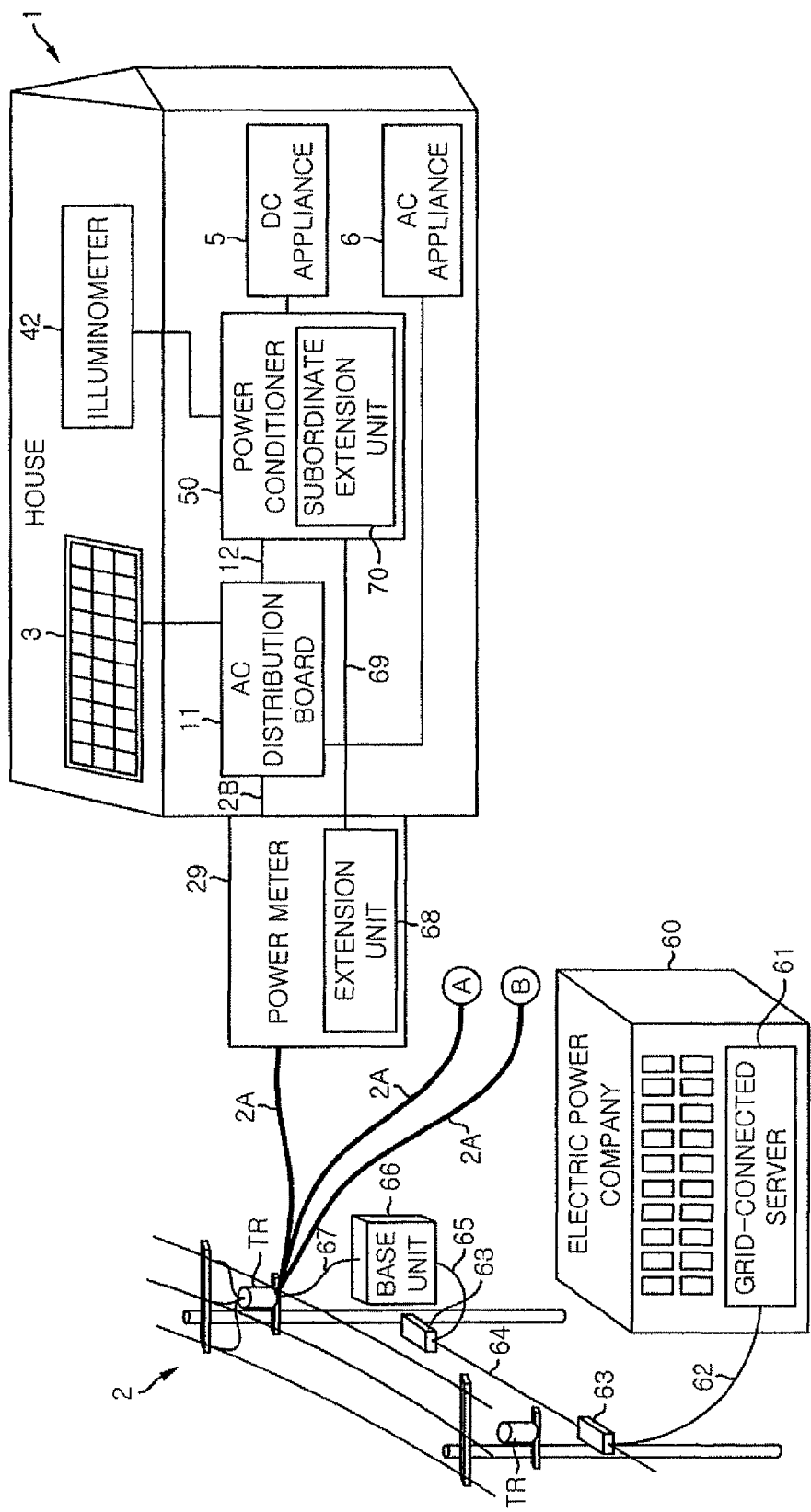
Figure 3:
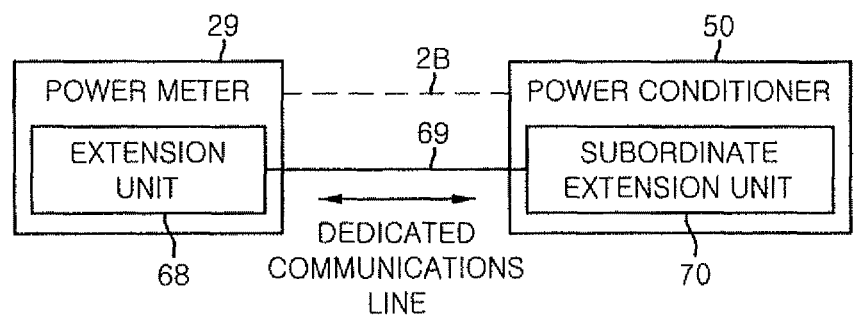
FIG. 3 schematically shows a connection for communications between a power meter and a power conditioner in the electric power management system of the first embodiment.
Figure 4:
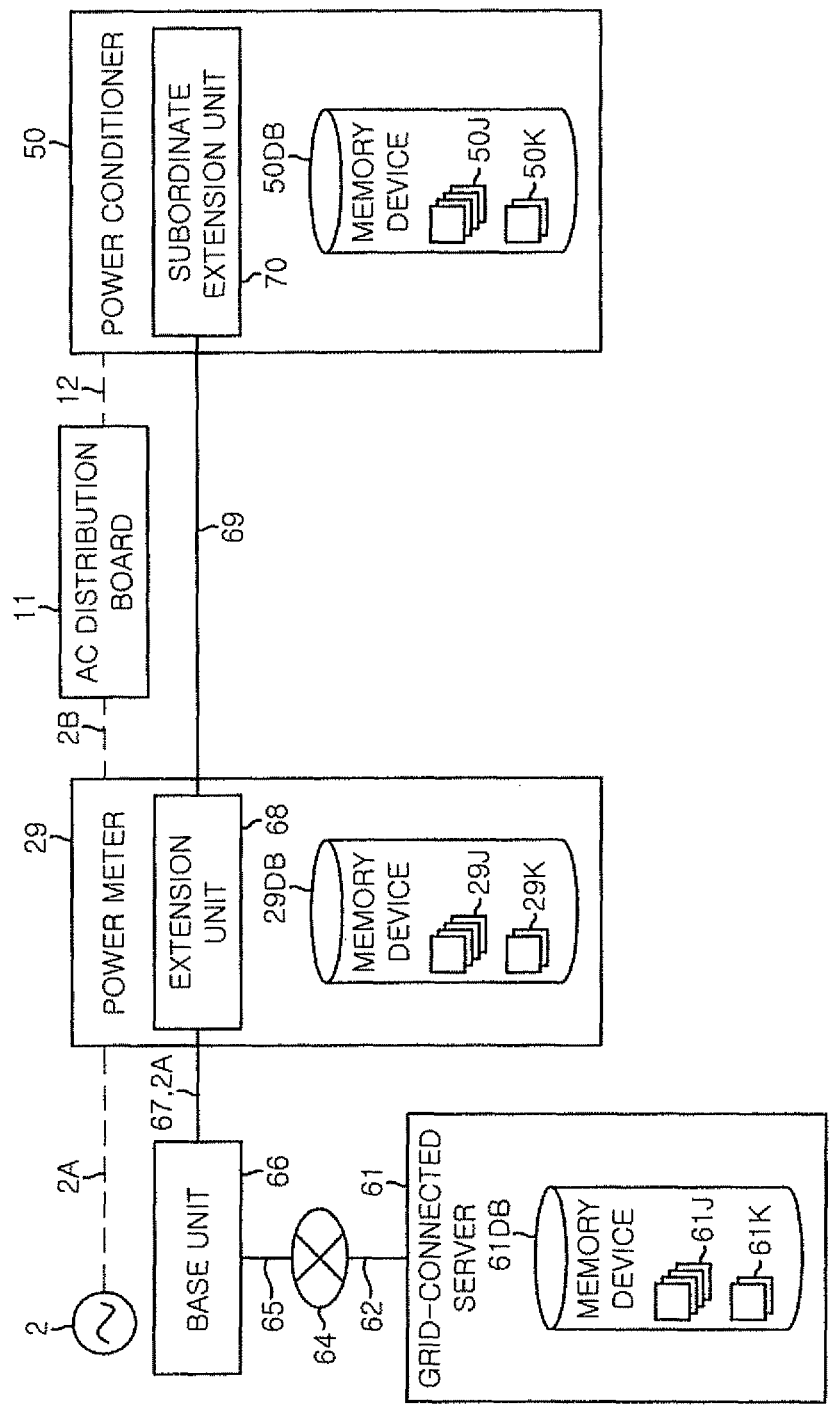
FIG. 4 schematically shows a connection for communications between a grid-connected server and the power conditioner of the first embodiment.

Next, the specific configuration of the electric power management system in accordance with the present embodiment will be described with reference to FIGS. 2 to 4. FIGS. 2A and 2B specifically show the configuration of the electric power management system. FIG. 3 schematically shows the configuration of a communications line between the power meter 29 and the power conditioner 50, and FIG. 4 schematically illustrates a communications line between the power conditioner 50 and a grid-connected server 61. Although, in FIG. 3, FIGS. 7 to 9 and FIGS. 11 to 13, the power meter 29 and the power conditioner 50 are connected to each other by way of the AC distribution board 11, this is illustrated by a dotted line 2B for simplicity of illustration.

As shown in FIGS. 2A and 2B, the power supply system 1 provided in a house or other places is connected through the power meter 29 to an electric power system of the AC power source 2 managed by an electric power company 60. That is, a plurality of power meters 29 is connected to the electric power system of the AC power source 2 through individual lead-in power lines 2A from a step-down transformer TR. Furthermore, the power meters 29 are provided with extension units 68 having the function of making power line communications with a base unit 66 disposed on an electric pole, and the base unit 66 on the electric pole and the extension unit 68 of each of the power meters 29 are connected to each other through the power signal line 67 and the lead-in power line 2A with the step-down transformer TR interposed therebetween. That is, the lead-in power line 2A transmits AC power between the electric power system and the power meter 29, and serves as a communications medium through which a power line communications signal is transmitted between the base unit 66 and the extension unit 68 of each of the power meter 29.

The electric power company 60 has a dedicated communications line 64 used in remotely reading the amount of power measured by the power meter 29. The communications line 64 is similar in form to the wiring line of the electric power system of the AC power source 2. The base unit 66 is communicatively connected to the communications line 64 through a communications line 65 and a media converter 63. That is, the base unit 66 enables communications signals to be exchanged between the communications line 64 and the power signal line 67 and converts the type of received signals into the type of transmitted signals and vice versa. Furthermore, a meter reading server (not shown) of the electric power company 60 is communicatively connected to the communications line 64. Accordingly, the meter reading server can perform a so-called remote reading that acquires the amount of power (the meter reading results) measured by each of the power meters 29 communicatively connected through the communications line 64 and records the amount of power thus acquired.

Furthermore, the electric power company 60 has a grid-connected server (management center) 61 for managing information used to stabilize AC power flowing through the power system of the commercial power source, and the grid-connected server 61 is communicatively connected to the communications line 64 through the communications line 62 and the media converter 63. Accordingly, the grid-connected server 61 of the electric power company 60 is communicatively connected to the power meters 29, connected to the communications line 64, through the communications line 64.

For example, the grid-connected server 61 generates and stores grid-connected information, that is, information for use in stabilizing the AC power of the electric power system managed by the electric power company 60, based on pieces of power information such as the power generation amounts of the respective power plants held by the electric power company 60, the power consumption amounts of the respective electric power systems distinguished for respective areas, and the power amounts reversely supplied to the electric power system from the solar cells 3 or the like. That is, each of the power meters 29 communicatively connected to the grid-connected server 61 is configured to obtain grid-connected information for use in stabilizing the above-described electric power system from the grid-connected server 61.

Further, the grid-connected server 61 generates grid-connected information that determines an electric power to be outputted from each of the power plants or each group of solar cells 3 to the electric power system of the commercial power source such that the appropriate power is supplied to the electric power system of the corresponding commercial power source, based on an estimation on the power consumption amount of the electric power system of commercial power source obtained mainly from the past records.

Therefore, the accuracy of the grid-connected information is improved by generating the grid-connected information based on a more accurate estimation on the power consumption amounts obtained by using the power information having the estimated power consumption information and the like, information on the power generation amounts of the solar cells 3 and the like, in addition to the past records of the electric power company.

Furthermore, in the present embodiment, the communications between the grid-connected server 61 and the power meter 29 is performed by the first communications unit. That is, the first communications unit includes the communications line 64, the base unit 66, the lead-in power line 2A, and the extension unit 68 of the power meter 29 that communicatively connect the grid-connected server 61 and the power meter 29 to each other. Furthermore, the first communications unit, as described above, performs communications between the electric power company 60 and the base unit 66 on the electric pole and communications between the base unit 66 on the electric pole and the power meter 29.

As shown in FIG. 3, the power conditioner 50 is provided with a subordinate extension unit 70 having the function of making communications with the extension unit 68 of the power meter 29. The extension unit 68 of the power meter 29 and the subordinate extension unit 70 of the power conditioner 50 perform wired communications through a dedicated communications line 69 connecting them. Accordingly, the power meter 29 and the power conditioner 50 transfer AC power through the power line 2B, and transmit communications signals through the dedicated communications line 69. However, the communications between the extension unit 68 of the power meter 29 and the subordinate extension unit 70 of the power conditioner 50 is not limited to the wired communications performed through the dedicated communications line 69. In the present embodiment, a second communications unit is configured to communicatively connect the power meter 29 and the power conditioner 50 to each other. That is, the second communications unit includes the extension unit 68 of the power meter 29, the subordinate extension unit 70 of the power conditioner 50, and the dedicated communications line 69.

As shown in FIG. 4, the power meter 29 is provided with a memory device 29DB, and power information 29J, including the current, voltage, amount of power and the like measured by the power meter 29 with respect to AC power supplied and reversely supplied via the power meter 29, is stored in the memory device 29DB. Furthermore, the power conditioner 50 is provided with a memory device 50DB, and power information 50J, including the various types of power information collected in the power conditioner 50 or the estimated power consumption information, is stored in the memory device 50DB. Furthermore, the grid-connected server 61 is provided with a memory device 61DB, and various types of power information 61J, including the power generation amount of each power plant, the power consumption amount of each electric power system, and the amount of power reversely supplied to the electric power system, are stored in the memory device 61DB.

Furthermore, since the power meter 29 and the power conditioner 50 are communicatively connected to each other, the power meter 29 may acquire the power information 50J of the power conditioner 50 and store it in the memory device 29DB as the power information 29J. On the contrary, the power conditioner 50 may acquire the power information 29J of the power meter 29 and store it in the memory device 50DB as the power information 50J.

Furthermore, since the grid-connected server 61 and the power meter 29 are communicatively connected to each other, the grid-connected server 61 may acquire the power information 29J of the power meter 29 and store it in the memory device 61DB as the power information 61J. On the contrary, the power meter 29 may acquire the power information 61J of the grid-connected server 61 and store it in the memory device 29DB as the power information 29J. Accordingly, the grid-connected server 61 and the power conditioner 50 can transfer information to each other via the power meter 29, the grid-connected server 61 may acquire the power information 50J of the power conditioner 50 via the memory device 29DB of the power meter 29 and store it in the memory device 61DB as the power information 61J. On the contrary, the power conditioner 50 may acquire the power information 61J of the grid-connected server 61 via the memory device 29DB of the power meter 29 and store it in the memory device 50DB as the power information 50J.

Furthermore, the grid-connected information 61K generated to stabilize the electric power system of the commercial power source is also stored in the grid-connected server 61 of the memory device 61DB. That is, similar to the power information 61J of the grid-connected server 61, this grid-connected information 61K can be acquired by the power meter 29 and be stored in the memory device 29DB as the grid-connected information 29K and may be acquired by the power conditioner 50 and stored in the memory device 50DB as the grid-connected information 50K. That is, the power conditioner 50 can share various types of power information 50J or grid-connected information 50K not only with the power meter 29 but also with the grid-connected server 61.

Figure 5:
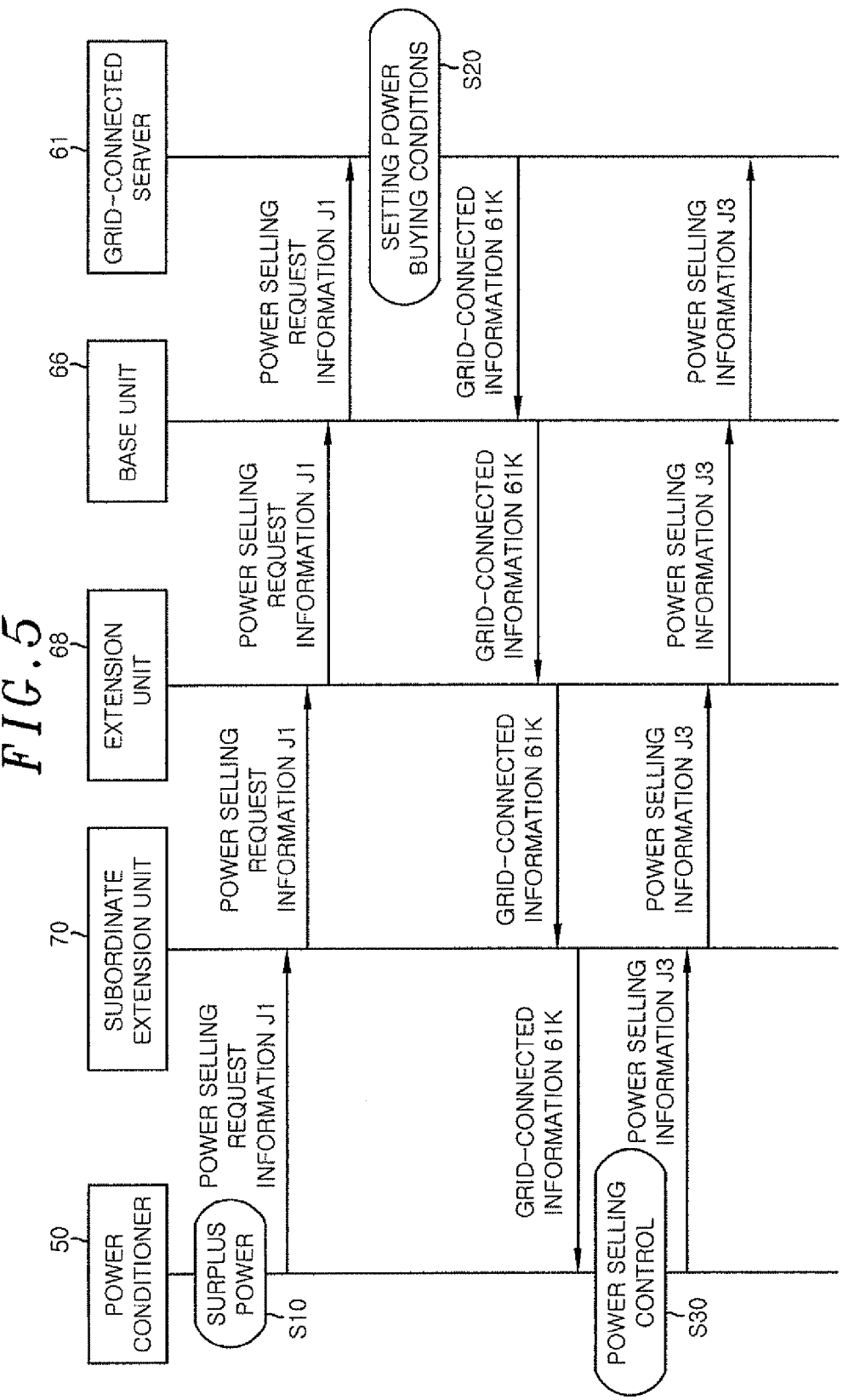
FIG. 5 illustrates relationships between devices during the power selling process of the power conditioner of the first embodiment.
Figure 6:
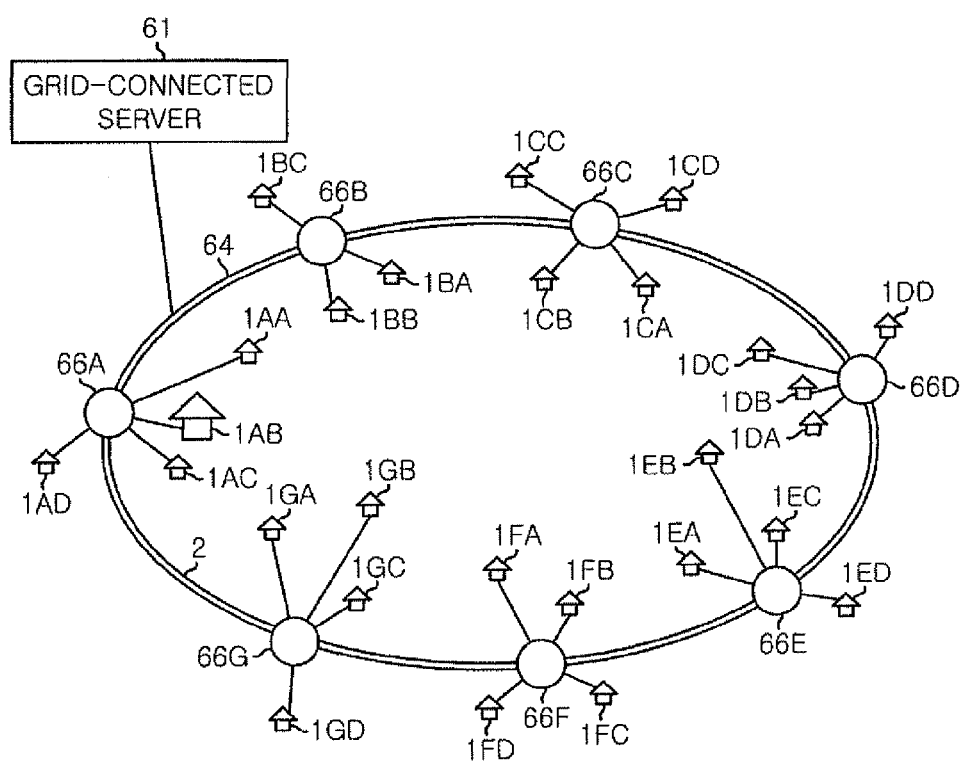
FIG. 6 schematically illustrates relationships among multiple power supply systems associated with the power management system of the first embodiment.

Next, the stabilization of the electric power system of the commercial power source based on the grid-connected information will be described with reference to FIGS. 5 and 6. FIG. 5 shows a sequence of information processing in the power management system when the power conditioner 50 outputs power generated by the solar cells 3 to the electric power system of the commercial power source, and FIG. 6 is a schematic view of the electric power system of the AC power source 2 and the communications line 64 connected to the grid-connected server 61.

Generally, the AC power quality (frequency, voltage, and the like) of the electric power system of the AC power source 2 is stabilized in a predetermined state, and the power from an power generation apparatus, such as the solar cells 3, is adjusted to be consistent with the quality of the AC power of the electric power system of the commercial power source to be connected to the power generation apparatus. After such grid-connection is achieved, the adjusted power is outputted to the electric power system of the commercial power source. In other words, the quality of the power of the solar cells 3 is adjusted to be consistent with that of the AC power of the electric power system of the commercial power source by the power conditioner 50, and the adjusted power is outputted to the electric power system of the commercial power source after the voltage of the power is adjusted to a voltage that is higher than a voltage of the electric power system of the commercial power source.

In this case, when the reverse supply (output) of power to the electric power system of the commercial power source is performed by a plurality of solar cells 3 (power conditioners 50), the voltage of the electric power system of the commercial power source may be increased. Furthermore, the increase in the voltage of the electric power system of the commercial power source may cause the problem of reducing the difference between the output voltage of the power conditioner 50 (solar cells 3) and the voltage of the electric power system of the commercial power source, resulting in reduction of the amount of power outputted from each power conditioner 50 (solar cells 3) to the electric power system.

Accordingly, in the present embodiment, the power conditioner 50 outputs the power of the solar cells 3 to the electric power system of the commercial power source based on the grid-connected information 50K acquired from the grid-connected server 61. Specifically, as shown in FIG. 5, when surplus power that is not consumed by electric appliances is produced in the power generated by the solar cells 3 (step S10), the power conditioner 50 transmits power selling request information J1 requesting permission to the grid-connected server to output (sell) the corresponding surplus power from the power conditioner 50 to the electric power system of the commercial power source. The power selling request information J1 is transmitted to the grid-connected server 61 from the subordinate extension unit 70 of the power conditioner 50 through the extension unit 68 of the power meter 29 and the base unit 66 on the electric pole in such a way that the power information 50J of the power conditioner 50 is acquired by the grid-connected server 61.

When the grid-connected server 61 receives the power selling request information J1 from the power conditioner 50, the conditions for the power output permitted to the corresponding power conditioner 50, that is, the power buying conditions of the electric power company 60 are set as the grid-connected information 61K generated based on various types of power information 61J (step S20). Furthermore, the grid-connected server 61 transmits to the corresponding power conditioner 50 the grid-connected information 61K in which the corresponding conditions for power output (the power buying conditions) are set. The grid-connected information 61K transmitted by the grid-connected server 61 is transferred to the power conditioner through the base unit 66 on the electric pole, the extension unit 68 of the power meter 29, and the subordinate extension unit 70 of the power conditioner 50 in sequence.

When the grid-connected information 61K is transferred, the power conditioner 50 performs a power selling control for outputting (selling) an electric power to the electric power system of the commercial power source based on the conditions for power output (the power buying conditions) included in the corresponding grid-connected information 61K (step S30). The voltage outputted from the power conditioner 50 is increased by the power selling control, and therefore the electric power is outputted from the power conditioner 50 to the electric power system of the commercial power source.

Furthermore, the amount of power sold by the power conditioner 50 as power selling information J3 is transmitted to the grid-connected server 61. Accordingly, the power selling information J3 is transferred to the grid-connected server 61 through the subordinate extension unit 70 of the power conditioner 50, the extension unit 68 of the power meter 29, and the base unit 66 on the electric pole in sequence in such a way that the power information 50J of the power conditioner 50 is acquired by the grid-connected server 61. Accordingly, the grid-connected server 61 can check the power selling status of the power conditioner 50, and can stabilize the amount of output power from the power conditioner 50 and the electric power system of the commercial power source.

As shown in FIG. 6, a plurality of houses having respective power supply systems 1 are connected to the electric power system of the commercial power source. Specifically, the communications line 64 disposed along the electric power system of the commercial power source is communicatively connected to the multiple power supply systems 1 through respective base units 66A to 66G adjacent to the step-down transformers individually provided on the electric power system of the commercial power source.

That is, each of multiple power supply systems 1AA, 1AB, 1AC, and 1AD connected to the base unit 66A is communicatively connected to the grid-connected server 61 and the other power supply systems through the base unit 66A and the communications line 64. In the same manner, each of multiple power supply systems 1BA, 1BB, and 1BC connected to the base unit 66B is communicatively connected to the grid-connected server 61 and the other power supply systems through the base unit 66B and the communications line 64. Furthermore, in the same manner, each of multiple power supply systems 1CA, 1CB, 1CC and 1CD connected to the base unit 66C and each of multiple power supply systems 1DA, 1DB, 1DC and 1DD connected to the main unit 66D are communicatively connected to the grid-connected server 61 and the other power supply systems through the corresponding base units 66C and 660 and the communications line 64.

Furthermore, in the same manner, each of multiple power supply systems 1EA, 1EB, 1EC and 1ED connected to the base unit 66E and each of multiple power supply systems 1FA, 1FB, 1FC and 1ED connected to the base unit 66F are communicatively connected to the grid-connected server 61 and the other power supply systems via the corresponding base units 66E and 66F and the communications line 64. Furthermore, each of multiple power supply systems 1GA, 1GB, 1GC and 1GD connected to the base unit 66G is communicatively connected to the grid-connected server 61 and the other power supply systems via the base unit 66G and the communications line 64.

In the meantime, if the multiple power supply systems connected to the electric power system of the commercial power source as described above perform initiation and termination of power selling based on their individual determinations, power selling initiation or termination timings may be overlapped with each other. When the power selling initiation or termination timings are overlapped with each other, the voltages of the commercial power source may be changed, thereby resulting in an undesirable influence on the stabilization of the electric power in the electric power system of the commercial power source.

Specifically, the high voltages simultaneously outputted from multiple power conditioners 50 may increase the voltage of the electric power system of the commercial power source. Further, the simultaneous termination of the outputs of multiple power conditioners 50 may reduce the voltage of the electric power system of the commercial power source.

In order to overcome the above problems, in the present embodiment, each of the power conditioners 50 supplies an electric power based on the grid-connected information, and, if the grid-connected information has not been received, the electric power is outputted based on a value arbitrarily and appropriately generated by a power generation apparatus to the electric power system.

Specifically, when the power supply system 1 desires to sell the electric power, the power supply system 1 transmits power selling request information J1 to the grid-connected server 61. When the grid-connected server 61 receives pieces of power selling request information J1 from the respective power supply systems 1, the grid-connected server 61 coordinates the pieces of power selling request information J1 so as not to harm the stabilization of the electric power of the electric power system of the commercial power source, and generates grid-connected information 50K in which the coordinated results are set as the power buying conditions with respect to each power supply system 1. The grid-connected server 61 transfers the generated grid-connected information 50K to the corresponding power supply system 1. The power supply system 1 that has received the grid-connected information 50K outputs (sells) power from the power conditioner 50 based on the power buying conditions set by the grid-connected server 61, thereby maintaining the stabilization of the power of the electric power system of the commercial power source.

For example, when the grid-connected server 61 receives pieces of power selling request information J1 from the multiple power supply systems 1AA, 1BA, 1CA, 1DA, 1EA, 1FA, and 1GA, respectively, the grid-connected server 61 determines whether or not the stabilization of the power of the electric power system of the commercial power source can be harmed if the powers from all of the power supply systems are outputted to the electric power system of the commercial power source.

If it is determined that the stabilization of the power of the electric power system of the commercial power source can be harmed, the periods for which electric power is outputted from each of the power supply systems are coordinated. Specifically, with respect to each of the power supply systems 1AA, 1BA and 1CA, the power buying condition is set such that electric power can be outputted only for a predetermined period, and with respect to each of the power supply systems 1DA, 1EA, 1FA and 1GA, the power buying condition is set such that electric power can be outputted after the predetermined period. Further, in view of the power buying conditions, the grid-connected server 61 determines whether or not each of the power conditioners 50 can output electric power to the electric power system of the commercial power source, and such determination is also used to control the electric power outputted from each of the power conditioners 50. Accordingly, the output of the electric power to the electric power system of the commercial power source from the power supply systems is distributed over time, so that the stabilization of the power of the electric power system of the commercial power source can be achieved.

Meanwhile, when electric power cannot be outputted to the electric power system of the commercial power source, the power conditioner 50 stores the electric power desired to be outputted therefrom, in, e.g., a battery 16, and outputs the corresponding electric power stored in the battery 16 when the electric power can be outputted. Therefore, it is possible to effectively use electric power generated by the solar cells 3.

Further, for example, the amount of electric power generated by the solar cells 3 provided in the power supply system 1 varies considerably depending on the received illuminance of sunlight. This variation in the amount of power generation considerably varies the amount of power that each power supply system receives from the electric power system of the commercial power source or that each power supply system outputs to the electric power system of the commercial power source. That is, if there is simultaneous variation in the amounts of electric power that the multiple power supply systems 1 receive from the electric power system of the commercial power source or the amounts of electric power that the multiple power supply systems output to the electric power system of the commercial power source, the variation in the amount of power of each power supply system 1 may harm the stabilization of the electric power system of the commercial power source.

However, the variation in the illuminance of sunlight is influenced by the movement of the clouds and, thus, based on illuminance variations in time, which can be obtained by acquiring a wide range of illuminance information, it is possible to estimate illuminance variations at each point in the corresponding information range. Further, it is possible to estimate the variation in the amount of power generation from the solar cells 3 based on the estimated illuminance variations.

Accordingly, the illuminance information acquired from the power conditioner 50 of each of the power supply systems 1AA to 1GD through each power meter is collected in the grid-connected server 61, and the grid-connected server 61 estimates the illuminance variation of each of the power supply systems 1AA to 1GD in accordance with the movement of the clouds based on the collected illuminance information and the location of each of the power supply systems 1AA to 1GD corresponding to each piece of the illuminance information and sets the power buying conditions based on the corresponding estimation.

Accordingly, it is possible to estimate the variation in the amount of power generation in the solar cells 3 caused by the illuminance variations in accordance with the movement of the clouds, and the stabilization of the power of the electric power system of the commercial power source can be maintained by setting the conditions of selling power that do not harm the stabilization of the power of the electric power system of the commercial power source for each of the power supply systems 1AA to 1GD in advance. Furthermore, the approximate location of each power supply system 1 may be determined based on the location of a corresponding step-down transformer or each base unit, and the precise location thereof may be determined based on an address registered for the power meter 29 managed by the electric power company 60.

When the illuminance information of the power supply system 1 is utilized as described above, the illuminance can be estimated with high precision based on the acquisition of information about the movement of the clouds at intervals shorter than the intervals of normally provided weather information, so that the amount of power generated by the solar cells 3 can also be estimated with high precision, and therefore the stabilization of the electric power system of the commercial power source can be maintained at a higher level. That is, in regard to the estimation of illuminance, when the decreases in illuminance in the sequence of the power supply systems 1AD, 1AC, 1AB and 1AA on the left side of FIG. 6 are measured, it is estimated that the illuminance of the power supply systems 1BA to 1BC connected to the base unit 66B sequentially decreases and thereafter the illuminance of the power supply systems 1CA to 1CD connected to the base unit 66C sequentially decreases. Furthermore, commonly provided weather information may also be used as additional means for estimation of illuminance. For example, referring to the direction of the wind for moving the clouds included in the weather information, if a decrease in the illuminance of the power supply system 1AD is measured when the wind blows from the base unit 66A to the base unit 66C, the illuminance of each power supply system 1 is estimated to decrease as well. In all cases, the conditions of selling power are set based on the above estimations, or the amount of power supplied to the electric power system of the commercial power source varies to deal with the estimated increase and decrease in the amount of power consumed, so that the stabilization of the power of the electric power system of the commercial power source can be appropriately maintained.

As described above, the electric power management system in accordance with the present embodiment can provide the following effects.

(1) Grid-connected information 61K, which is information related to the power stabilization of the electric power system that the power meter 29 received from the grid-connected server 61, is also shared to the power conditioner 50, and the electric power is outputted to the electric power system of the commercial power source from the power conditioner 50 based on the grid-connected information. Since the grid-connected information is information related to the power stabilization of the electric power system of the commercial power source, the appropriate electric power based on the grid-connected information can be outputted to the electric power system of the commercial power source by the power conditioner 50. Further, the electric power can be outputted to the electric power system of the commercial power source at an appropriate timing based on the grid-connected information. Accordingly, with such electric power management system, the quality of the electric power can be stabilized by suppressing an increase in the voltage of the electric power system of the commercial power source and the like.

(2) Grid-connected information is reliably and accurately transmitted to the power meter 29 from the grid-connected server 61 through the communications line 64 managed same as the electric power system of the commercial power source. Accordingly, since such grid-connected information is used by the power conditioner 50, the grid connection of output power therefrom can be achieved more accurately, so that the stabilization of the electric power quality of the electric power system of the commercial power source can be maintained.

(3) The applicability of the electric power management system can be increased by using the solar cells 3 (photovoltaic power generation apparatus) generally used in recent years.

(4) Since the electric power generated by the solar cells 3 can be stored in the battery, the electric power generated by the solar cells 3 can be supplied to the electric power system of the commercial power source at an appropriate timing based on the grid-connected information. That is, the electric power to be consumed soon after generation is temporarily stored, and therefore, regardless of the timing of the generation, the electric power can be efficiently outputted to the electric power system of the commercial power source based on the grid-connected information, so that the electric power quality of the electric power system of the commercial power source is stabilized. Furthermore, the solar cells 3 and the like can output a greater amount of electric power generated to the electric power system of the commercial power source.

(5) In case of an electric power generated by the solar cells 3 whose generation pattern is gradually varied by illuminance of the sunlight and is not consistent with a power consumption pattern, such electric power can be stored in a battery without waste if it is not consumed. By doing so, the electric power generated by the solar cells 3 is efficiently outputted to the electric power system of the commercial power source based on the grid-connected information regardless of the timing of the generation, and therefore the electric power quality of the electric power system of the commercial power source can be stabilized, and further the solar cells 3 can output a greater amount of power to the electric power system of the commercial power source.

(6) In case where the electric power generated by the solar cells 3 cannot be outputted to the electric power system of the commercial power source in accordance with the determination based on the grid-connected information, the electric power, which is not consumed, is stored in the battery 16, thereby minimizing the waste of the generated power.

(7) In case where the electric power generated by the solar cells 3 can be outputted to the electric power system of the commercial power source in accordance with the determination based on the grid-connected information, the electric power of the power conditioner 50 can be outputted to the electric power system of the commercial power source based on the preferred conditions, and therefore an increase in the amount of output power can be expected. Accordingly, when power is output to the electric power system of the commercial power source, the electric power can be efficiently outputted to the electric power system of the commercial power source and there is no concern about the output power making the power quality of the electric power system of the commercial power source unstable.

(8) The power conditioner 50 is controlled by the grid-connected server 61 such that the electric power is outputted to the electric power system of the commercial power source by the power conditioner 50 based on the conditions for power output included in the grid-connected information which is produced based on a situation such as the power generation of the solar cells 3 or the like. Therefore, the power quality of the electric power system of the commercial power source is further improved.

(9) Since the conditions for power output are generated based on power generation information and environmental information, more appropriate conditions for power output can be provided to the power conditioner 50, so that the stabilization of the electric power system of the commercial power source and the efficient use of the power generated by the solar cells 3 are further promoted.

(10) Since the conditions for power output included in the grid-connected information are produced based on the power generation amount of the solar cells 3 obtained from the illuminance information and power generation information, the electric power generated by the solar cells 3 can be efficiently outputted to the electric power system of the commercial power source.

(11) Since the location of the power meter 29 is individually designated in the grid-connected server 61, a change in illuminance or atmospheric temperature can be estimated by referring to the weather forecast and the like. Such estimation can be used to generate grid-connected information.

(12) The actually measured illuminance is collected through each power meter 29, and a change in the illuminance of the solar cells 3 corresponding to each power meter 29 is estimated based on the collected illuminance information. Accordingly, the accuracy of the estimation of the power generation amount of the solar cells 3 is improved, and the stabilization of the electric power system of the commercial power source can be improved using the grid-connected information generated based on the above estimation.

(13) Since the high-precision estimation of the power consumption amount of the power conditioner 50 can be performed, the grid-connected server 61 can perform the stabilization of the electric power system of the commercial power source in a planned manner.

(14) Since the communications between the power meter 29 and the power conditioner 50 are performed in the form of wired communications, the stability of the transfer of the information can be increased.

(15) Since the communications between the power meter 29 and the base unit 66 is performed in a wired manner, communications equipment is simplified, and stable communications is ensured. Further, by using power line communications, the wired communications between the power meter and the base unit can be performed without requiring new wiring installation for communications, thereby saving on wiring in the electric power management system.

Second Embodiment

Figure 7:
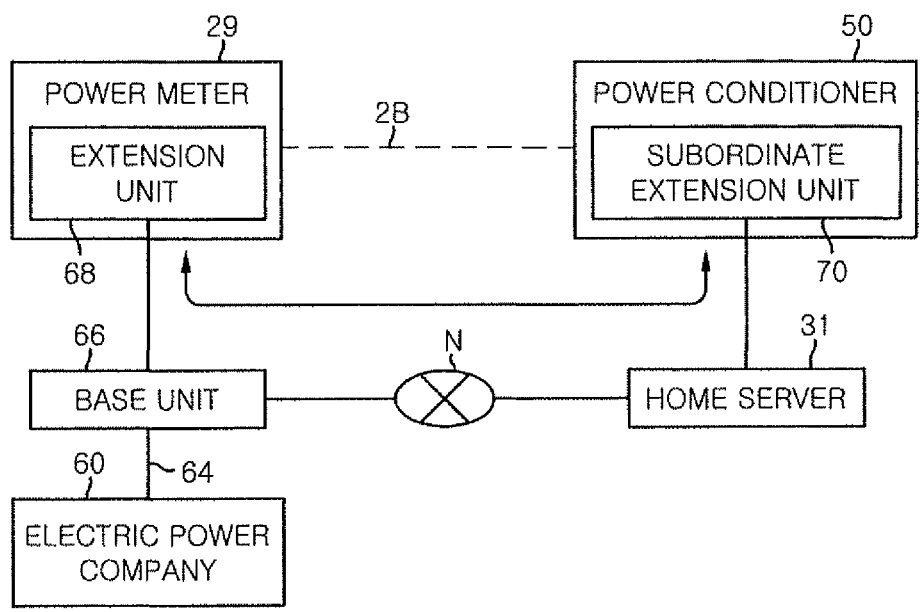
FIG. 7 schematically illustrates a case where communications between a power meter and a power conditioner is performed through an external network in an electric power management system in accordance with a second embodiment of the present invention.

Next, the electric power management system in accordance with a second embodiment of the present invention will be described with reference to FIG. 7. FIG. 7 schematically illustrates a case where communications between a power meter 29 and a power conditioner 50 is performed through an external communications network N.

Further, the second embodiment differs from the first embodiment in that the communications between the power meter 29 and the power conditioner 50 is performed through the external communications network N. Other points remain the same as those of the first embodiment. In the present embodiment, description will be focused on the points differing from the first embodiment. Like reference numerals will be given to like parts, and redundant description thereof will be omitted for the sake of convenience.

As shown in FIG. 7, the extension unit 68 of the power meter 29 is communicatively connected to a base unit 66. The base unit 66 is communicatively connected to an electric power company 60 through a communications line 64, and is also communicatively connected to the external communications network N. That is, the extension unit 68 of the power meter 29 is communicatively connected to the external communications network N through the base unit 66. Furthermore, the extension unit 68 of the power meter 29 can logically select one from the communications line 64 and the external communications network N to perform communications through the appropriate use of network addresses depending on the recipient of the communications.

Meanwhile, the subordinate extension unit 70 of the power conditioner 50 is communicatively connected to the home server 31, and is communicatively connected to the external communications network N through the home server 31. Since the extension unit 68 of the power meter 29 and the subordinate extension unit 70 of the power conditioner 50 are communicatively connected to the external communications network N as described above, the extension unit 68 of the power meter 29 and the subordinate extension unit 70 of the power conditioner 50 are communicatively connected to each other through the external communications network N.

Accordingly, the power information 29J of the power meter 29 and the grid-connected information 29K from the grid-connected server 61 are transferred to the power conditioner 50 through the external communications network N, and the power information 50J of the power conditioner 50 is also transferred to the power meter 29 and the grid-connected server 61 through the external communications network N.

As described above, the present embodiment can provide effects identical with or similar to effects (1) to (15) provided by the first embodiment. In addition, the present embodiment can provide the following effects.

(16) The power meter 29 and the power conditioner 50 communicate with each other through the external communications network N, and therefore dedicated communications equipment for enabling the power meter 29 and the power conditioner 50 to directly communicate with each other is not necessary. For example, the power meter 29 allows a communications device of the grid-connected server 61 to be also used over the external communications network N and the power conditioner makes connections with the external communications network N by using communications infrastructures in a house, so that there is no need to provide devices in the power meter 29 and the power conditioner 50 to make the direct communications therebetween. Accordingly, it is possible to increase the degree of freedom of the application of the electric power management system.

Third Embodiment

Figure 8:
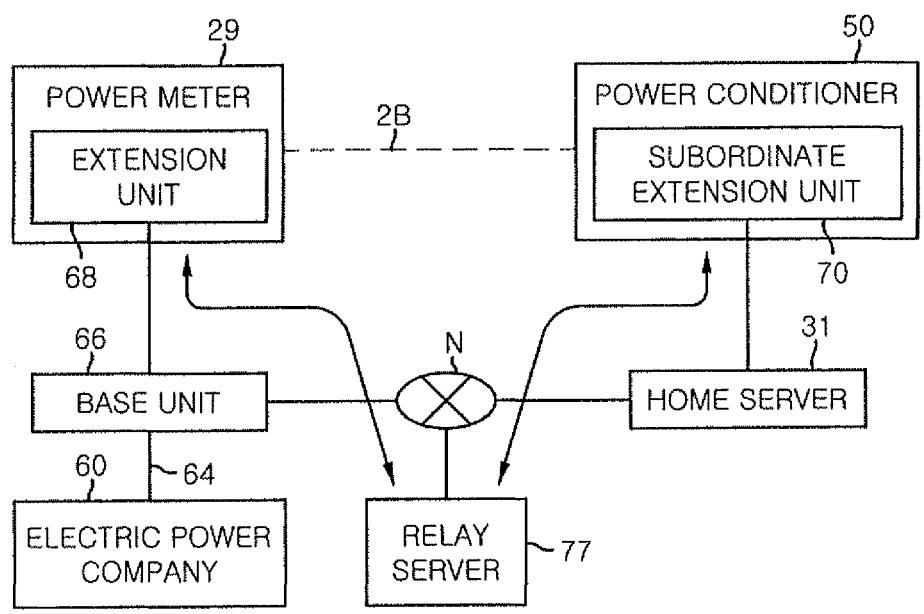
FIG. 8 schematically illustrates a case where communications between a power meter and a power conditioner is performed through the server of an external communications network in an electric power management system in accordance with a third embodiment of the present invention.

Next, an electric power management system in accordance with a third embodiment of the present invention will be described with reference to FIG. 8. FIG. 8 schematically illustrates a case where the communications between a power meter 29 and a power conditioner 50 is performed through a relay server 77 provided on the external communications network N.

Further, the third embodiment differs from the second embodiment in that the communications between the power meter 29 and the power conditioner 50 is performed through the relay server 77 provided on the external communications network N. Other points remain the same as those of the second embodiment. In the present embodiment, description will be focused on the points differing from the second embodiment. Like reference numerals will be given to like parts, and redundant description thereof will be omitted for the sake of convenience.

As shown in FIG. 8, the relay server 77 that enables the extension unit 68 of the power meter 29 and the subordinate extension unit 70 of the power conditioner 50 to communicate with each other is connected to the external communications network N. Accordingly, the extension unit 68 of the power meter 29 communicates with the relay server connected to the external communications network N through the base unit 66, and the power information 29J and the grid-connected information 29K transmitted to the power conditioner 50 are temporarily stored in the relay server 77. Further, the subordinate extension unit 70 of the power conditioner 50 communicates with the relay server 77 of the external communications network N through a home server 31, and acquires the power information 29J and the grid-connected information 29K transmitted to the corresponding power conditioner 50.

Meanwhile, the power information 50J transmitted from the power conditioner 50 to the power meter 29 is temporarily stored in the relay server 77, and the power meter 29 acquires the power information 50J transmitted to the corresponding power meter 29 from the relay server 77. By providing the relay server 77, the degree of freedom in time of the communications between the power meter 29 and the power conditioner 50 can be increased.

As described above, the present embodiment can provide effects identical with or similar to effects (1) to (16) provided by the first and the second embodiment. In addition, the present embodiment can provide the following effects.

(17) Even in case where the power meter 29 and the power conditioner 50 communicate with the relay server 77 in an asynchronous fashion, the grid-connected information can be transferred to each other, and therefore the configuration of communications unit or communications conditions used to transfer the grid-connected information are simplified, so that the degree of freedom of the configuration of the power management system can be increased.

Fourth Embodiment

Figure 9:
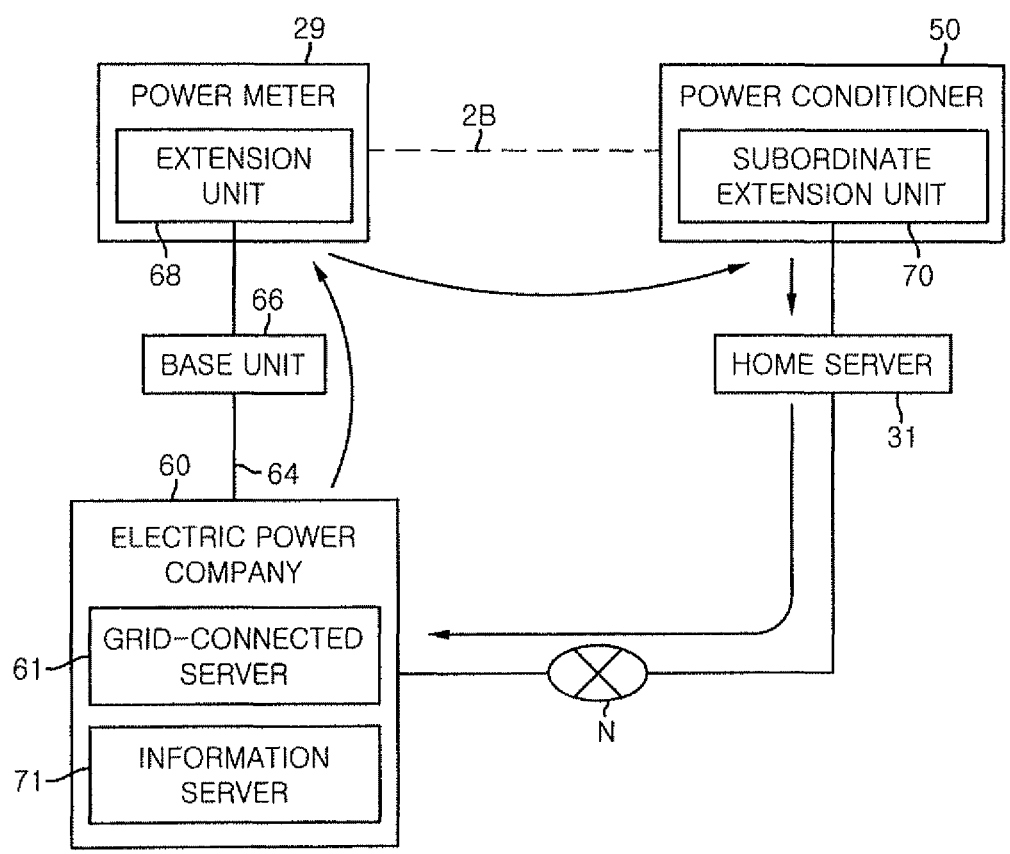
FIG. 9 schematically illustrates a case where communications between a power meter and a power conditioner is performed through an electric power company connected to an external network in the power management system in accordance with a fourth embodiment of the present invention.

Next, the power management system in accordance with a fourth embodiment of the present invention will be described with reference to FIG. 9. FIG. 9 schematically illustrates a case where the communications between a power meter 29 and a power conditioner 50 is performed through an information server 71 provided in an electric power company 60.

Furthermore, the fourth embodiment differs from the first embodiment in that the information server 71 is provided in the electric power company 60 and the electric power company is connected to the external communications network N. In the present embodiment, description will be focused on the points differing from the first embodiment. Like reference numerals will be given to like parts, and redundant description thereof will be omitted.

As described in FIG. 9, the subordinate extension unit 70 of the power conditioner 50 is connected to a home server 31, and the home server 31 is connected to the electric power company 60 through the external communications network N. Further, an information server 71 that is not connected to a grid-connected server 61 but is connected to the external communications network N is provided in the electric power company 60. That is, the electric power company 60 is communicatively connected to the power conditioner 50 through the base unit 66 and the extension unit 68 of the power meter 29, and is also communicatively connected to the power conditioner 50 through the external communications network N.

In general, the dedicated communications line 64 of the electric power company 60 disposed along the electric power system of the commercial power source has a high level of security by, for example, physically separating it from the external communications network N and the like. Accordingly, information requiring high security such as grid-connected information 61K is transferred from the electric power company 60 to the power conditioner 50 through a path including the communications line 64, the base unit 66, the extension unit 68 and the subordinate extension unit 70. Further, information not requiring high security, such as the power information 50J of the power conditioner 50 and the like, is transferred from the power conditioner 50 to the information server 71 of the electric power company 60 through a path including the home server 31 and the external communications network N.

As described above, the present embodiment can provide effects identical with or similar to effects (1) to (15) provided by the first embodiment. In addition, the present embodiment can provide the following effect.

(18) In performing communications between the electric power company 60 and the power supply system 1, an appropriate communications method can be selected depending on the type, quantity or required security level of the information to be communicated.

Further, the respective embodiments described above may be modified as follows.

In the respective embodiments described above, there is illustrated a case where the power conditioner 50 includes the control unit 7 and the DC distribution board 8. However, the present invention is not limited thereto. Various devices, e.g., an AC distribution board, a control box and a home server, may be included in the power conditioner 50 as long as they enable the power supply system to properly perform the management of electric power. On the contrary, the DC distribution board 8 may be excluded from the power conditioner 50. This makes it possible to increase the degree of freedom in configuring the power conditioner and to increase the applicability of the electric power management system.

In the respective embodiments described above, there is illustrated a case in which the power conditioner 50 is provided with the memory device 50DB. However, the present invention is not limited thereto. The memory device may not be provided in the power conditioner as long as the power conditioner can manage the power information. In this case, the power information may be stored in the home server or the like so that the power conditioner can gain access thereto.

This makes it possible to increase the degree of freedom in configuring the power conditioner and to increase the applicability of the electric power management system.

In the respective embodiments described above, there is illustrated a case where the environmental information is illuminance information. However, the present invention is not limited thereto. The environmental information may be information related to an environment where the power supply system is disposed, and may include information, e.g., atmospheric temperature, humidity, wind direction, and wind velocity as long as the information is related to the power generation or changes in consumption. For example, information on atmospheric temperature and humidity may be used to estimate changes in the power consumption of an air conditioner in a house, and information on the direction of the wind and the velocity of the wind may be used to predict the movement of the clouds.

Figure 10A:
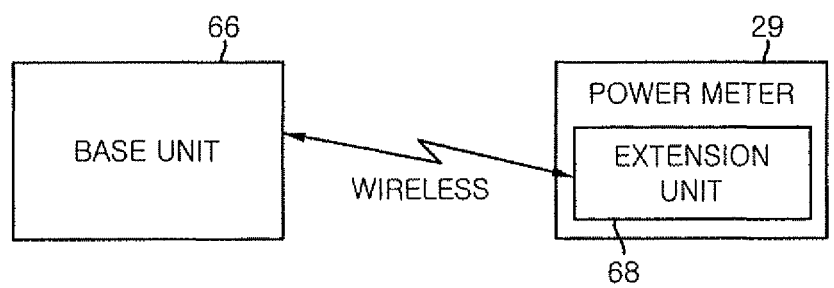

In the respective embodiments described above, there is illustrated a case where the first communications unit is wired communications in which the communications between the grid-connected server 61 and the power meter 29 is performed by using the communications line 64 and the lead-in power line 2A as communications mediums. However, the present invention is not limited thereto. The communications between the base unit on the electric pole and the power meter may be performed through, e.g., wireless communications as shown in FIG. 10A. Accordingly, wiring installation for communications is not necessary between the power meter and the base unit, and the time and space are not required for the wiring installation of a communications line to the power meter.

In the respective embodiments described above, there is illustrated a case where the extension unit 68 of the power meter 29 and the subordinate extension unit 70 of the power conditioner 50 perform wired communications through the dedicated communications line 69.

Figure 10B:
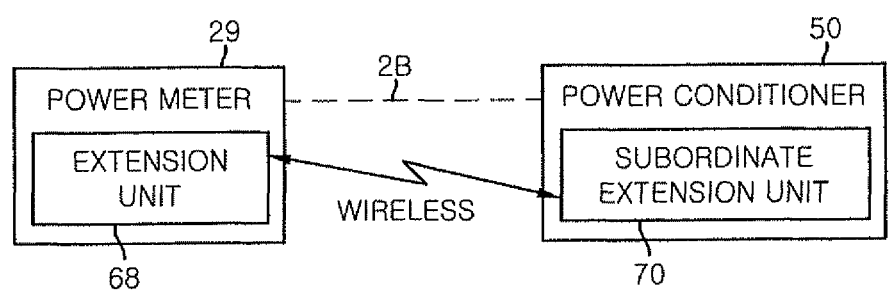

However, the present invention is not limited thereto. The communications between the extension unit of the power meter and the subordinate extension unit of the power conditioner may be performed through wireless communications as the second communications unit. That is, for example, as shown in FIG. 10B, the extension unit 68 of the power meter and the subordinate extension unit 70 of the power conditioner 50 are provided with a wireless device that enables reciprocal wireless communications, and therefore the corresponding power meter 29 and the corresponding power conditioner 50 can communicate with each other in a wireless manner. Accordingly, wiring installation is not required for the communications between the power meter 29 and the power conditioner 50, and such electric power management system can be easily introduced.

In the respective embodiments described above, there is illustrated a case where the extension unit 68 of the power meter 29 and the subordinate extension unit 70 of the power conditioner 50 perform wired communications through the dedicated communications line 69.

Figure 11:
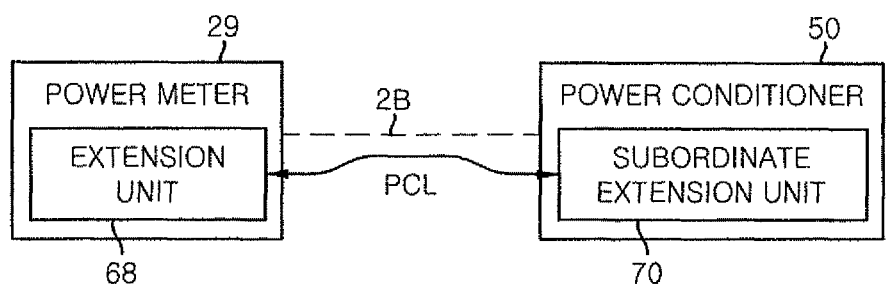
FIG. 11 illustrates an example in which communications between a power meter and a power conditioner is power line communications (PLC) in each of the first to fourth embodiments.

However, the present invention is not limited thereto. The communications between the extension unit of the power meter and the subordinate extension unit of the power conditioner may be performed through power line communications (PLC) as the second communications unit by using the power line, carrying electric power between the power meter and the power conditioner. The power line is used as a communications medium. That is, for example, as shown in FIG. 11, the extension unit 68 of the power meter and the subordinate extension unit 70 of the power conditioner 50 are provided with a power line communications device capable of reciprocal communications therebetween, and therefore the corresponding power meter 29 and the corresponding power conditioner 50 can perform communications by using power line communications (PLC). Accordingly, wiring installation for communications is not required for the communications between the power meter and the power conditioner, and the stable information transfer is achieved through the wired communications.

In the respective embodiments described above, there is illustrated a case where a driving power of the power meter 29 is supplied from the electric power system of the commercial power source.

Figure 12:
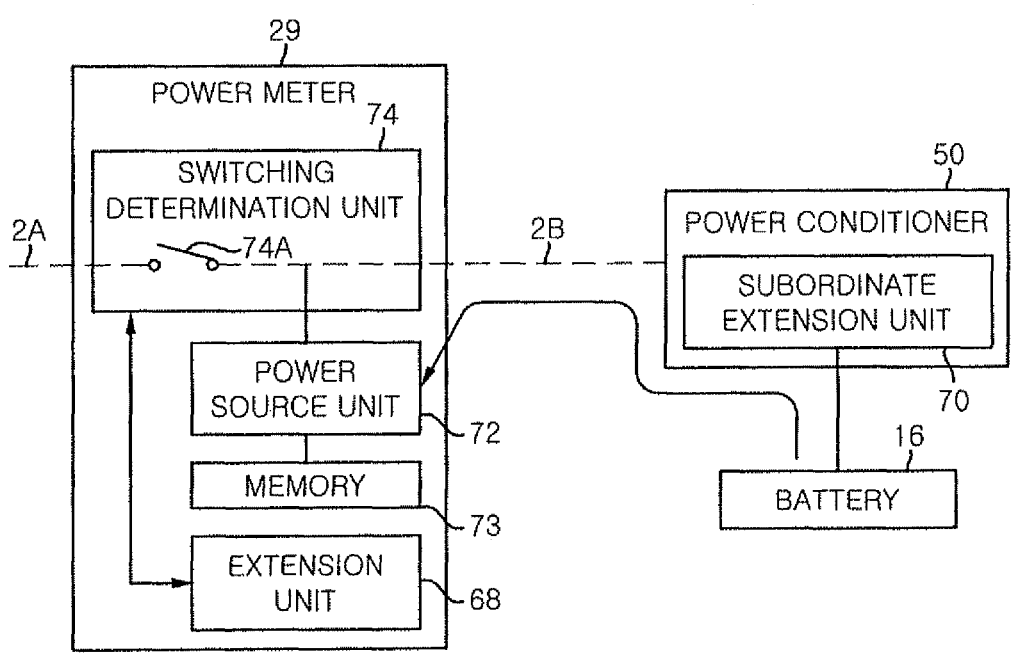
FIG. 12 illustrates an example in which a power is supplied to the power meter from a battery when the electric power system is subjected to power failure in each of the first to fourth embodiments.

However, the present invention is not limited thereto. The driving power of the power meter may be supplied from the battery through the power conditioner when there is the power failure in the electric power system of the commercial power source. For example, as shown in FIG. 12, when the switching determination unit 74 of the power meter 29 detects a power failure, the supply of electric power from the battery 16 is requested to the power conditioner 50 through the communications between the extension unit 68 and the subordinate extension unit 70. Therefore, the electric power is supplied from the power conditioner 50 through the power line 2B and, then, the electric power outputted from the power conditioner 50 is supplied to a power source unit 72 by opening a switch 74A between the power meter 29 and the lead-in power line 2A. Further, from the power source unit 72, the electric power is supplied to the memory 73. Accordingly, the operation of the power meter 29 is ensured during a power failure, and backup can be performed more rapidly and reliably than a case where a power failure is detected by the power conditioner 50 during a power failure.

Meanwhile, when the switching determination unit 74 of the power meter 29 detects the recovery of electric power, an interruption in the supply of the electric power from the battery 16 is requested to the power conditioner 50, and the switch 74A is closed in synchronization with the interruption of the supply of the electric power from the battery 16. Therefore, the connection between the power meter 29 and the lead-in power line 2A is recovered. This makes it possible to reduce the concern about the information stored in the power meter 29 being lost because of the power failure, and the communications with the power conditioner 50 is ensured even during the power failure, thereby improving the convenience of the operation of the electric power management system.

Figure 13:
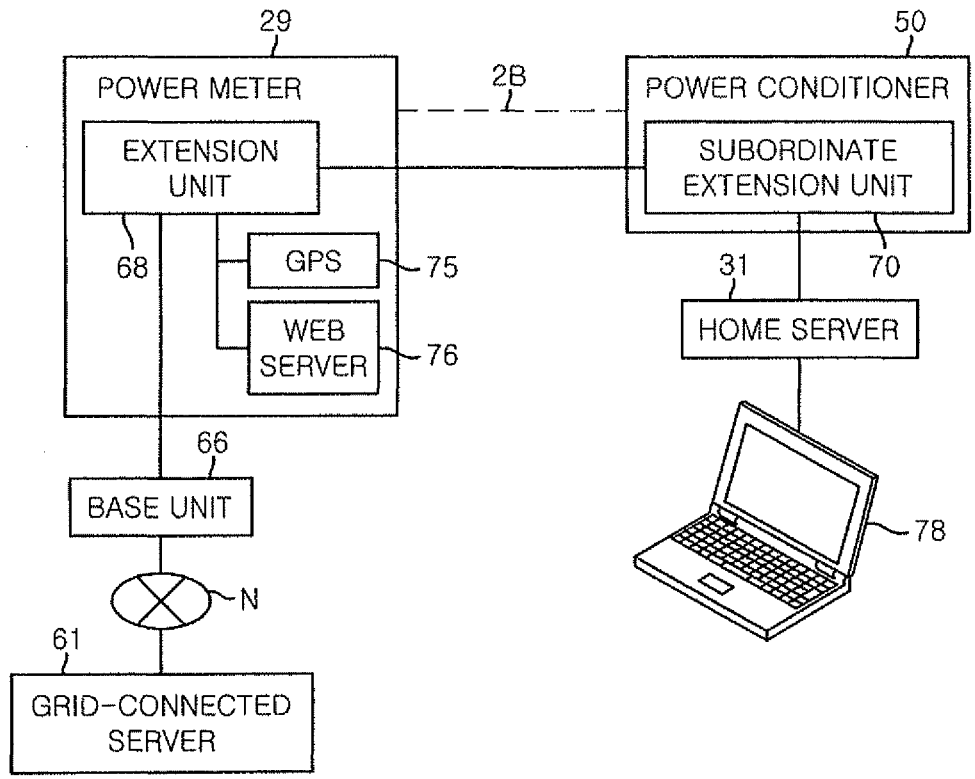
FIG. 13 illustrates an example of the power meter of each of the first to fourth embodiments.

In the respective embodiments described above, there is illustrated a case where the location of the power meter 29 is individually designated using an address registered in the electric power company 60. However, the present invention is not limited thereto. The location of the power meter may be individually designated by using data acquired using a location measuring device such as Global Positioning system (GPS) provided in the power meter, or may be set in the power meter, the power conditioner or the electric power company by a constructor by using a setting device provided with a GPS (not shown). For example, as shown in FIG. 13, the power meter 29 is provided with a GPS 75, and location information that can be acquired by the corresponding GPS 75 is transferred from the power meter 29 to the grid-connected server 61 by means of communications, so that the location of the power meter 29 can be individually designated by the grid-connected server 61. Accordingly, when the power meter 29 is installed, the setting of a location is not required and there is no concern about the erroneous setting of a location, so that the specification of the location of the power meter 29 can be performed more reliably and easily.

In the respective embodiments described above, there is illustrated a case where power information 29J, such as voltage, current and the amount of power measured by the power meter 29, is transferred to the meter reading center of the electric power company 60 or the power conditioner 50. However, the present invention is not limited thereto. Power information such as voltage, current and the amount of power measured by the power meter may be easily referred. For example, as shown in FIG. 13, a web server 76 may be provided in the power meter 29, and the power meter 29 may return power information 29J, such as voltage, current and the amount of power measured by the power meter 29, in response to a request from the browser of a computer 78 accessed via a home server 31 and the power conditioner 50. Accordingly, access to the power meter 29 is facilitated, and therefore the maintenance thereof is improved. As a result, the information of the power meter, for example, the amount of power input from the electric power system of the commercial power source or the amount of power outputted to the electric power system, and the like, can be easily checked by using the web browser of a personal computer.

In the respective embodiments described above, there is illustrated a case where the grip-connected server generates grid-connected information based on information acquired from the power conditioner of each power supply system via the power meter and transmits the grid-connected information to the power conditioner of each power supply system. However, the present invention is not limited thereto, and instead the power conditioner of each power supply system may generate grid-connected information, or may receive grid-connected information from the power conditioner of another power supply system via the power meter. For example, the power conditioner of the power supply system 1AA may receive information from the power conditioner of another power supply system 1AD via the base unit 66A and the communications line 64.

Figure 14:
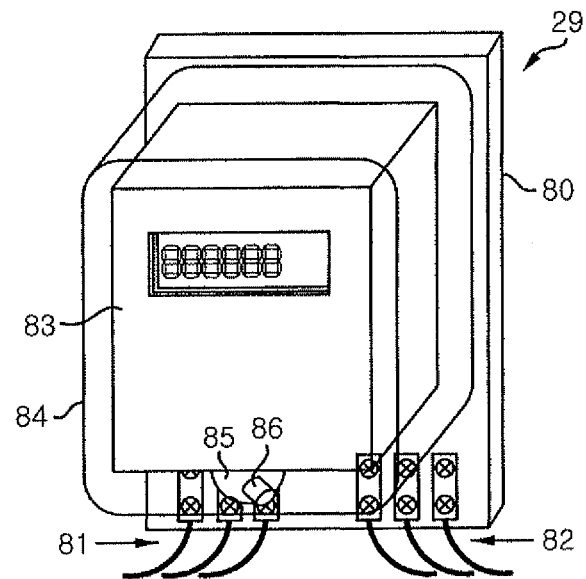
FIG. 14 is a perspective view illustrating an example in which a camera has been provided in the power meter of each of the first to fourth embodiments.

In the respective embodiments described above, there is illustrated a case where the power meter 29 is commonly installed on the outside a house, for example, an outer wall of a house. Accordingly, the power meter may be provided with a surveillance camera capable of photographing an area surrounding the corresponding power meter. For example, as shown in FIG. 14, a camera 86 having a seat 85 whose direction can be changed is provided under the measurement unit 83 of the power meter 29 which can be installed on an outer wall via a seat 80 and to which power lines 81 and 82 are connected, and inside a protective cover 84 which protects the measurement unit 83 from the rain and wind. Accordingly, the exterior of a house can be monitored using the power meter 29 installed outside the house. This power meter 29 may be used for prevention of crimes, and makes the wiring for the camera 86 unnecessary using the supply of power from the power meter 29 and the communications of the power meter 29.

In the respective embodiments described above, there is illustrated a case where the grid-connected server 61 and the power conditioner 50 communicate with each other through the base unit 66. However, the present invention is not limited thereto. The power conditioner may communicate with some other power conditioner through the base unit. For example, seven to ten houses are connected to step-down transformers. Base units are provided in a corresponding relationship with every step-down transformer or some of the step-down transformers. In this case, the power conditioner can make communications through the base unit with another power conditioner connected to the step-down transformer corresponding to the base unit. This makes it possible to make interactive communications through the power conditioner in a limited area. For example, the information on the availability of electric power can be exchanged between the adjoining power conditioners. This configuration can also be used in transferring various kinds of information, which is not directly related to the electric power, such as the notice information and the crime prevention information. The information, such as a notice information in a limited area may be provided in the form of an image or a voice through a device having a user interface, such as an operation panel 40, a door phone extension unit or a television set, each of which is communicatively connected to the power conditioner 50.

In the respective embodiments described above, there is illustrated a case in which the solar cell 3 is used as a power generating device. However, the present invention is not limited thereto. The power generating device may be other devices having a power generating function, such as a battery, a fuel cell and a wind power generation device.

While the invention has been shown and described with respect to the embodiments, it will be understood by those skilled in the art that various changes and modification may be made without departing from the scope of the invention as defined in the following claims.

What is claimed is:

1. An electric power management system connected to an electric power system of a commercial power source, the electric power management system comprising:
   a power generation apparatus configured to generate electric power;
   an electric appliance configured to consume electric power;
   a power meter connected to the electric power system, and configured to detect an amount of electric power inputted from the electric power system and an amount of electric power outputted to the electric power system; and
   a power conditioner connected to the power generation apparatus and the electric appliance through respective power lines;
   wherein the electric power management system coordinates and manages the amount of the electric power inputted from the electric power system and the amount of the electric power outputted to the electric power system based on an amount of the electric power generated by the power generation apparatus and an amount of the electric power consumed by the electric appliance,
   wherein the power conditioner outputs the electric power, generated by the power generation apparatus, to the electric power system based on grid-connected information, which is information related to stabilization of electric power of an electric power system,
   wherein the grid-connected information is acquired from a management center managing the power of the electric power system and from a power conditioner of another electric power management system,
   wherein the power meter receives the grid-connected information from the management center managing the electric power of the electric power system through a first communications unit, and the power conditioner acquires the grid connected information from the power meter through a second communications unit, and
   wherein the power meter receives the grid-connected information from the management center managing the electric power of the electric power system and a power meter of said another electric power management system through the first communications unit.

2. The electric power management system of claim 1, wherein the power generation apparatus is provided in plural numbers, and electric power generated by one of the power generation apparatuses is stored in a battery device storing electric power, the battery device being another one of the power generation apparatuses.

3. The electric power management system of claim 2, wherein if it is determined based on the grid-connected information that the electric power generated by said one of the power generation apparatuses cannot be outputted to the electric power system of the commercial power source, the power conditioner stores the electric power, which is not consumed by the electric appliance, in the battery device.

4. The electric power management system of claim 3, wherein the management center acquires, as the grid-connected information, status information of the power generation apparatus from the power meter through the first communications unit, the status information being acquired by the power meter from the power conditioner corresponding to the power meter connected to the electric power system of the commercial power source through the second communications unit, and the management center generates, based on the acquired information, grid-connected information including conditions for output power under which electric power is outputted to the electric power system of the commercial power source by the power conditioner.

5. The electric power management system of claim 4, wherein the power generation apparatus further includes a photovoltaic power generation apparatus,
wherein the status information of the power generation apparatus includes generation information indicative of an amount of electric power generated by the photovoltaic power generation apparatus, and illuminance information indicative of illuminance of light irradiating the photovoltaic power generation apparatus, which serves as environmental information indicative of surrounding environmental status of the photovoltaic power generation apparatus, and
wherein the management center generates the conditions for output power included in the grid-connected information based on the amount of electric power generated by the photovoltaic power generation apparatus, the amount of the electric power being obtained based on the illuminance information and the generation information of the photovoltaic power generation apparatus.

6. The electric power management system of claim 5, wherein the power meter is provided in plural numbers and the power meters are connected to the electric power system of the commercial power source, and
wherein the management center estimates a change in illuminance of the photovoltaic power generation apparatus corresponding to each of the power meters, based on the illuminance information inputted through each of the power meters and location information indicative of a location of each of the power meters that outputs the illuminance information, and the management center generates the grid-connected information based on the estimated change in illuminance.

7. The electric power management system of claim 2, wherein if it is determined based on the grid-connected information that the electric power generated by said one of the power generation apparatuses can be outputted to the electric power system of the commercial power source, the power conditioner outputs the electric power, which is generated by said one of the power generation apparatuses and stores in the battery device, from the corresponding battery device to the electric power system of the commercial power source.

8. The electric power management system of claim 7, wherein the management center acquires, as the grid-connected information, status information of the power generation apparatus from the power meter through the first communications unit, the status information being acquired by the power meter from the power conditioner corresponding to the power meter connected to the electric power system of the commercial power source through the second communications unit, and the management center generates, based on the acquired information, grid-connected information including conditions for output power under which electric power is outputted to the electric power system of the commercial power source by the power conditioner.

9. The electric power management system of claim 8, wherein the power generation apparatus further includes a photovoltaic power generation apparatus,
wherein the status information of the power generation apparatus includes generation information indicative of an amount of electric power generated by the photovoltaic power generation apparatus, and illuminance information indicative of illuminance of light irradiating the photovoltaic power generation apparatus, which serves as environmental information indicative of surrounding environmental status of the photovoltaic power generation apparatus, and
wherein the management center generates the conditions for output power included in the grid-connected information based on the amount of electric power generated by the photovoltaic power generation apparatus, the amount of the electric power being obtained based on the illuminance information and the generation information of the photovoltaic power generation apparatus.

10. The electric power management system of claim 9, wherein the power meter is provided in plural numbers and the power meters are connected to the electric power system of the commercial power source, and
wherein the management center estimates a change in illuminance of the photovoltaic power generation apparatus corresponding to each of the power meters, based on the illuminance information inputted through each of the power meters and location information indicative of a location of each of the power meters that outputs the illuminance information, and the management center generates the grid-connected information based on the estimated change in illuminance.

11. The electric power management system of claim 1, wherein the management center acquires, as the grid-connected information, status information of the power generation apparatus from the power meter through the first communications unit, the status information being acquired by the power meter from the power conditioner corresponding to the power meter connected to the electric power system of the commercial power source through the second communications unit, and the management center generates, based on the acquired information, grid-connected information including conditions for output power under which electric power is outputted to the electric power system of the commercial power source by the power conditioner.

12. The electric power management system of claim 11, wherein the power generation apparatus further includes a photovoltaic power generation apparatus,
wherein the status information of the power generation apparatus includes generation information indicative of an amount of electric power generated by the photovoltaic power generation apparatus, and illuminance information indicative of illuminance of light irradiating the photovoltaic power generation apparatus, which serves as environmental information indicative of surrounding environmental status of the photovoltaic power generation apparatus, and wherein the management center generates the conditions for output power included in the grid-connected information based on the amount of electric power generated by the photovoltaic power generation apparatus, the amount of the electric power being obtained based on the illuminance information and the generation information of the photovoltaic power generation apparatus.

13. The electric power management system of claim 12, wherein the power meter is provided in plural numbers and the power meters are connected to the electric power system of the commercial power source, and wherein the management center estimates a change in illuminance of the photovoltaic power generation apparatus corresponding to each of the power meters, based on the illuminance information inputted through each of the power meters and location information indicative of a location of each of the power meters that outputs the illuminance information, and the management center generates the grid-connected information based on the estimated change in illuminance.

14. The electric power management system of claim 1, wherein the power conditioner functions as a estimation control unit for measuring and storing past power management data and producing estimated power consumption information indicative of an amount of electric power currently consumed, based on the stored power management data, and wherein the management center generates the grid-connected information by referring to the estimated power consumption information acquired from the power conditioner.

15. The electric power management system of claim 1, wherein the management center and the power meter perform relay communications through a base unit provided on a pole, and, among the communications between the management center and the base unit and the communications between the base unit and the power meter, the first communications unit is configured such that the communications between the base unit and the power meter is wireless or wired communications.

16. An electric power management system connected to an electric power system of a commercial power source, the electric power management system comprising:

a power generation apparatus configured to generate electric power;

an electric appliance configured to consume electric power;

a power meter connected to the electric power system, and configured to detect an amount of electric power inputted from the electric power system and an amount of electric power outputted to the electric power system; and a power conditioner connected to the power generation apparatus and the electric appliance through respective power lines;

wherein the electric power management system coordinates and manages the amount of the electric power inputted from the electric power system and the amount of the electric power outputted to the electric power system based on an amount of the electric power generated by the power generation apparatus and an amount of the electric power consumed by the electric appliance, wherein the power conditioner outputs the electric power, generated by the power generation apparatus, to the electric power system based on grid-connected information, which is information related to stabilization of electric power of an electric power system, wherein the grid-connected information is acquired from a management center managing the power of the electric power system and from a power conditioner of another electric power management system, and wherein, if the grid-connected information has not been received, the electric power generated by the power generation apparatus is outputted to the electric power system based on an arbitrarily appropriately generated value.

\* \* \* \* \*